United States Patent
Yang et al.

(10) Patent No.: US 12,479,906 B2
(45) Date of Patent: Nov. 25, 2025

(54) COLLAGEN AND USE THEREOF

(71) Applicant: SHANXI JINBO BIO-PHARMACEUTICAL CO., LTD., Shanxi (CN)

(72) Inventors: Xia Yang, Shanxi (CN); Xiaobin Lan, Shanxi (CN); Lingling Wang, Shanxi (CN); Yongjian Zhang, Shanxi (CN); Xin Liu, Shanxi (CN); Zengyao Liu, Shanxi (CN); Wenfei Yang, Shanxi (CN)

(73) Assignee: SHANXI JINBO BIO-PHARMACEUTICAL CO., LTD., Taiyuan (CN)

( * ) Notice: Subject to any disclaimer, the term of this patent is extended or adjusted under 35 U.S.C. 154(b) by 0 days.

(21) Appl. No.: 18/933,318

(22) Filed: Oct. 31, 2024

(65) Prior Publication Data

US 2025/0122268 A1    Apr. 17, 2025

Related U.S. Application Data

(63) Continuation of application No. PCT/CN2023/134277, filed on Nov. 27, 2023.

(30) Foreign Application Priority Data

May 12, 2023   (CN) .......................... 202310537499.9

(51) Int. Cl.
   *C07K 14/78*   (2006.01)
   *A61K 38/00*   (2006.01)

(52) U.S. Cl.
   CPC .............. *C07K 14/78* (2013.01); *A61K 38/00* (2013.01)

(58) Field of Classification Search
   None
   See application file for complete search history.

(56) References Cited

U.S. PATENT DOCUMENTS

| | | | | |
|---|---|---|---|---|
| 7,718,366 B2* | 5/2010 | Tsai | ..................... | C12Q 1/6883 536/23.1 |
| 8,618,250 B2* | 12/2013 | Russell | .................. | C07K 14/78 530/350 |
| 12,023,419 B2* | 7/2024 | Russell | ................. | A61L 31/044 |

FOREIGN PATENT DOCUMENTS

| | | |
|---|---|---|
| CN | 116715754 A | 9/2023 |
| WO | 2004031206 A2 | 4/2004 |

* cited by examiner

*Primary Examiner* — Blaine Lankford
(74) *Attorney, Agent, or Firm* — Lando & Anastasi, LLP

(57) ABSTRACT

Provided is collagen and uses thereof. Collagen includes an N-terminal sequence and a C-terminal sequence, wherein the N-terminal sequence includes one or more repeating units, and the repeating unit includes an amino acid sequence shown in SEQ ID NO. 15. The recombinant type II humanized collagen prepared by the present invention has high activity in promoting cell adhesion, does not produce an immune response when applied to the human body, can be obtained on a large scale, and is expected to be widely used in the field of cartilage repair.

7 Claims, 5 Drawing Sheets

Specification includes a Sequence Listing.

SEQUENCE LISTING

```
Sequence total quantity: 34
SEQ ID NO: 1              moltype = AA  length = 102
FEATURE                   Location/Qualifiers
source                    1..102
                          mol_type = protein
                          organism = synthetic construct
SEQUENCE: 1
GKPGDDGEAG KPGKAGERGP PGPQGARGFP GTPGLPGVKG HRGYPGLDGA KGEAGAPGVK   60
GESGSPGENG SPGPMGPRGL PGERGRTGPA AAGARGNDG QP                      102

SEQ ID NO: 2              moltype = AA  length = 208
FEATURE                   Location/Qualifiers
source                    1..208
                          mol_type = protein
                          organism = synthetic construct
SEQUENCE: 2
GKPGKAGERG PPGPQGARGF PGTPGLPGVK GHRGKPGKAG ERGPPGPQGA RGFPGTPGLP   60
GVKGHRGKPG KAGERGPPGP QGARGFPGTP GLPGVKGHRG KPGKAGERGP PGPQGARGFP  120
GTPGLPGVKG HRGKPGKAGE RGPPGPQGAR GFPGTPGLPG VKGHRGKPGK AGERGPPGPQ  180
GARGFPGTPG LPGVKGHRGK PGKAGERG                                    208

SEQ ID NO: 3              moltype = AA  length = 168
FEATURE                   Location/Qualifiers
```

```
                         source              1..168
                                             mol_type = protein
                                             organism = synthetic construct
SEQUENCE: 3
GEPGREGSPG ADGPPGRDGA AGVKGDRGET GAVGAPGAPG PPGSPGPAGP TGKQGDRGEA    60
GAQGPMGPSG PAGARGIQGP QGPRGDKGEA GEPGERGLKG HRGFTGLQGL PGPPGPSGDQ   120
GASGPAGPSG PRGPPGPVGP SGKDGANGIP GPIGPPGPRG RSGETGPA                168

SEQ ID NO: 4             moltype = AA   length = 90
FEATURE                  Location/Qualifiers
source                   1..90
                         mol_type = protein
                         organism = synthetic construct
SEQUENCE: 4
GSPGPAGPTG KQGDRGEAGA QGPMGPSGPA GARGIQGPQG PRGDKGEAGE PGERGLKGHR    60
GFTGLQGLPG PPGPSGDQGA SGPAGPSGPR                                    90

SEQ ID NO: 5             moltype = AA   length = 360
FEATURE                  Location/Qualifiers
source                   1..360
                         mol_type = protein
                         organism = synthetic construct
SEQUENCE: 5
GARGIQGPQG PRGDKGEAGE PGERGLKGHR GFTGLQGLPG PPGPSGARGI QGPQGPRGDK    60
GEAGEPGERG LKGHRGFTGL QGLPGPPGPS GARGIQGPQG PRGDKGEAGE PGERGLKGHR   120
GFTGLQGLPG PPGPSGARGI QGPQGPRGDK GEAGEPGERG LKGHRGFTGL QGLPGPPGPS   180
GARGIQGPQG PRGDKGEAGE PGERGLKGHR GFTGLQGLPG PPGPSGARGI QGPQGPRGDK   240
GEAGEPGERG LKGHRGFTGL QGLPGPPGPS GARGIQGPQG PRGDKGEAGE PGERGLKGHR   300
GFTGLQGLPG PPGPSGARGI QGPQGPRGDK GEAGEPGERG LKGHRGFTGL QGLPGPPGPS   360

SEQ ID NO: 6             moltype = AA   length = 360
FEATURE                  Location/Qualifiers
source                   1..360
                         mol_type = protein
                         organism = synthetic construct
SEQUENCE: 6
GSPGPAGPTG KQGDRGEAGA QGPMGPSGPA GARGIQGPQG PRGDKGEAGE PGERGLKGHR    60
GFTGLQGLPG PPGPSGDQGA SGPAGPSGPR GSPGPAGPTG KQGDRGEAGA QGPMGPSGPA   120
GARGIQGPQG PRGDKGEAGE PGERGLKGHR GFTGLQGLPG PPGPSGDQGA SGPAGPSGPR   180
GSPGPAGPTG KQGDRGEAGA QGPMGPSGPA GARGIQGPQG PRGDKGEAGE PGERGLKGHR   240
GFTGLQGLPG PPGPSGDQGA SGPAGPSGPR GSPGPAGPTG KQGDRGEAGA QGPMGPSGPA   300
GARGIQGPQG PRGDKGEAGE PGERGLKGHR GFTGLQGLPG PPGPSGDQGA SGPAGPSGPR   360

SEQ ID NO: 7             moltype = AA   length = 300
FEATURE                  Location/Qualifiers
source                   1..300
                         mol_type = protein
                         organism = synthetic construct
SEQUENCE: 7
GPQGARGFPG TPGLPGVKGH RGYPGLDGAK GPQGARGFPG TPGLPGVKGH RGYPGLDGAK    60
GPQGARGFPG TPGLPGVKGH RGYPGLDGAK GPQGARGFPG TPGLPGVKGH RGYPGLDGAK   120
GPQGARGFPG TPGLPGVKGH RGYPGLDGAK GPQGARGFPG TPGLPGVKGH RGYPGLDGAK   180
GPQGARGFPG TPGLPGVKGH RGYPGLDGAK GPQGARGFPG TPGLPGVKGH RGYPGLDGAK   240
GPQGARGFPG TPGLPGVKGH RGYPGLDGAK GPQGARGFPG TPGLPGVKGH RGYPGLDGAK   300

SEQ ID NO: 8             moltype = AA   length = 324
FEATURE                  Location/Qualifiers
source                   1..324
                         mol_type = protein
                         organism = synthetic construct
SEQUENCE: 8
GARGFPGTPG LPGVKGHRGY PGLDGAKGAR GFPGTPGLPG VKGHRGYPGL DGAKGARGFP    60
GTPGLPGVKG HRGYPGLDGA KGARGFPGTP GLPGVKGHRG YPGLDGAKGA RGFPGTPGLP   120
GVKGHRGYPG LDGAKGARGF PGTPGLPGVK GHRGYPGLDG AKGARGFPGT PGLPGVKGHR   180
GYPGLDGAKG ARGFPGTPGL PGVKGHRGYP GLDGAKGARG FPGTPGLPGV KGHRGYPGLD   240
GAKGARGFPG TPGLPGVKGH RGYPGLDGAK GARGFPGTPG LPGVKGHRGY PGLDGAKGAR   300
GFPGTPGLPG VKGHRGYPGL DGAK                                          324

SEQ ID NO: 9             moltype = AA   length = 336
FEATURE                  Location/Qualifiers
source                   1..336
                         mol_type = protein
                         organism = synthetic construct
SEQUENCE: 9
GFPGTPGLPG VKGHRGYPGL DGAKGFPGTP GLPGVKGHRG YPGLDGAKGF PGTPGLPGVK    60
GHRGYPGLDG AKGFPGTPGL PGVKGHRGYP GLDGAKGFPG TPGLPGVKGH RGYPGLDGAK   120
GFPGTPGLPG VKGHRGYPGL DGAKGFPGTP GLPGVKGHRG YPGLDGAKGF PGTPGLPGVK   180
GHRGYPGLDG AKGFPGTPGL PGVKGHRGYP GLDGAKGFPG TPGLPGVKGH RGYPGLDGAK   240
GFPGTPGLPG VKGHRGYPGL DGAKGFPGTP GLPGVKGHRG YPGLDGAKGF PGTPGLPGVK   300
```

```
GHRGYPGLDG AKGFPGTPGL PGVKGHRGYP GLDGAK                         336

SEQ ID NO: 10              moltype = AA   length = 336
FEATURE                    Location/Qualifiers
source                     1..336
                           mol_type = protein
                           organism = synthetic construct
SEQUENCE: 10
GTPGLPGVKG HRGYPGLDGA KGTPGLPGVK GHRGYPGLDG AKGTPGLPGV KGHRGYPGLD   60
GAKGTPGLPG VKGHRGYPGL DGAKGTPGLP GVKGHRGYPG LDGAKGTPGL PGVKGHRGYP  120
GLDGAKGTPG LPGVKGHRGY PGLDGAKGTP GLPGVKGHRG YPGLDGAKGT PGLPGVKGHR  180
GYPGLDGAKG TPGLPGVKGH RGYPGLDGAK GTPGLPGVKG HRGYPGLDGA KGTPGLPGVK  240
GHRGYPGLDG AKGTPGLPGV KGHRGYPGLD GAKGTPGLPG VKGHRGYPGL DGAKGTPGLP  300
GVKGHRGYPG LDGAKGTPGL PGVKGHRGYP GLDGAK                           336

SEQ ID NO: 11              moltype = AA   length = 312
FEATURE                    Location/Qualifiers
source                     1..312
                           mol_type = protein
                           organism = synthetic construct
SEQUENCE: 11
GERGLKGHRG FTGLQGLPGP PGPSGDQGAS GPAGPSGPRG ERGLKGHRGF TGLQGLPGPP   60
GPSGDQGASG PAGPSGPRGE RGLKGHRGFT GLQGLPGPPG PSGDQGASGP AGPSGPRGER  120
GLKGHRGFTG LQGLPGPPGP SGDQGASGPA GPSGPRGERG LKGHRGFTGL QGLPGPPGPS  180
GDQGASGPAG PSGPRGERGL KGHRGFTGLQ GLPGPPGPSG DQGASGPAGP SGPRGERGLK  240
GHRGFTGLQG LPGPPGPSGD QGASGPAGPS GPRGERGLKG HRGFTGLQGL PGPPGPSGDQ  300
GASGPAGPSG PR                                                     312

SEQ ID NO: 12              moltype = AA   length = 330
FEATURE                    Location/Qualifiers
source                     1..330
                           mol_type = protein
                           organism = synthetic construct
SEQUENCE: 12
GERGLKGHRG FTGLQGLPGP PGPSGDQGAS GPAGERGLKG HRGFTGLQGL PGPPGPSGDQ   60
GASGPAGERG LKGHRGFTGL QGLPGPPGPS GDQGASGPAG ERGLKGHRGF TGLQGLPGPP  120
GPSGDQGASG PAGERGLKGH RGFTGLQGLP GPPGPSGDQG ASGPAGERGL KGHRGFTGLQ  180
GLPGPPGPSG DQGASGPAGE RGLKGHRGFT GLQGLPGPPG PSGDQGASGP AGERGLKGHR  240
GFTGLQGLPG PPGPSGDQGA SGPAGERGLK GHRGFTGLQG LPGPPGPSGD QGASGPAGER  300
GLKGHRGFTG LQGLPGPPGP SGDQGASGPA                                  330

SEQ ID NO: 13              moltype = AA   length = 324
FEATURE                    Location/Qualifiers
source                     1..324
                           mol_type = protein
                           organism = synthetic construct
SEQUENCE: 13
GERGLKGHRG FTGLQGLPGP PGPSGDQGER GLKGHRGFTG LQGLPGPPGP SGDQGERGLK   60
GHRGFTGLQG LPGPPGPSGD QGERGLKGHR GFTGLQGLPG PPGPSGDQGE RGLKGHRGFT  120
GLQGLPGPPG PSGDQGERGL KGHRGFTGLQ GLPGPPGPSG DQGERGLKGH RGFTGLQGLP  180
GPPGPSGDQG ERGLKGHRGF TGLQGLPGPP GPSGDQGERG LKGHRGFTGL QGLPGPPGPS  240
GDQGERGLKG HRGFTGLQGL PGPPGPSGDQ GERGLKGHRG FTGLQGLPGP PGPSGDQGER  300
GLKGHRGFTG LQGLPGPPGP SGDQ                                        324

SEQ ID NO: 14              moltype = AA   length = 336
FEATURE                    Location/Qualifiers
source                     1..336
                           mol_type = protein
                           organism = synthetic construct
SEQUENCE: 14
GERGLKGHRG FTGLQGLPGP PGERGLKGHR GFTGLQGLPG PPGERGLKGH RGFTGLQGLP   60
GPPGERGLKG HRGFTGLQGL PGPPGERGLK GHRGFTGLQG LPGPPGERGL KGHRGFTGLQ  120
GLPGPPGERG LKGHRGFTGL QGLPGPPGER GLKGHRGFTG LQGLPGPPGER GLKGHRGFT  180
GLQGLPGPPG ERGLKGHRGF TGLQGLPGPP GERGLKGHRG FTGLQGLPGP PGERGLKGHR  240
GFTGLQGLPG PPGERGLKGH RGFTGLQGLP GPPGERGLKG HRGFTGLQGL PGPPGERGLK  300
GHRGFTGLQG LPGPPGERGL KGHRGFTGLQ GLPGPP                           336

SEQ ID NO: 15              moltype = AA   length = 42
FEATURE                    Location/Qualifiers
source                     1..42
                           mol_type = protein
                           organism = Homo sapiens
SEQUENCE: 15
GTPGLPGVKG HRGYPGLDGA KGTPGLPGVK GHRGYPGLDG AK                      42

SEQ ID NO: 16              moltype = DNA   length = 306
FEATURE                    Location/Qualifiers
source                     1..306
                           mol_type = other DNA
```

```
                        organism = synthetic construct
SEQUENCE: 16
ggtaaaccag gagatgatgg agaagcagga aaaccaggaa aagcaggaga aagaggaccg     60
cctggaccgc aaggagcacg tggatttcca ggaaccccgg gactgccggg tgtgaaaggt    120
catagaggat atccgggact ggatggagca aaaggagaca caggggcacc gggagttaaa    180
ggtgagagcg gaagcccggg agaaaatgga agccctggtc cgatgggtcc gagagggctg    240
ccgggtgaaa gagggcgtac cggtccggca ggagcagcag gtgcaagagg aaatgatgga    300
cagccg                                                               306

SEQ ID NO: 17           moltype = DNA  length = 623
FEATURE                 Location/Qualifiers
source                  1..623
                        mol_type = other DNA
                        organism = synthetic construct
SEQUENCE: 17
ggaaaaccog ggaaggccgg tgagcgcggt ccaccgggtc cgcagggcgc gcgtggggttc    60
ccgggcaccc cgggtctgcc gggtgttaaa ggtcatcgtg gcaagccggg caaggctggc    120
gagcgcggtc cgccaggtcc gcaaggtgcg agaggctttc cgggcactcc gggtttgccg    180
ggtgtcaaag gtcaccgtgg taaaccgggc aaggcgggtg agcgtggccc accgggtccg    240
cagggtgcgc gtggttttcc gggcacgccg gtttgccgg gcgttaaagg ccaccgcggc    300
aaaccgggca aggcgggtga acgtggccca ccgggtccgc aaggtgcacg tggcttcccg    360
ggcaccccgg gtctgcctgg cgtgaaaggt caccgtggca agcgggcaa agctggtgaa    420
cgtggtccgc ccggtccgca gggcgcgcgt ggctttccgg gaaccccggg cctgccgggc    480
gttaagggtc atcgtggcaa accgggcaag gctggtgagc gcggccacc gggtcctcaa    540
ggtgcccgtg gcttcccggg cacccccgggt ctgccgggtg tgaagggtca ccgcggtaaa    600
ccgggcaagg caggcgaacg cgg                                            623

SEQ ID NO: 18           moltype = DNA  length = 503
FEATURE                 Location/Qualifiers
source                  1..503
                        mol_type = other DNA
                        organism = synthetic construct
SEQUENCE: 18
gtgaaccagg tcgtgaaggt agcccaggtg cagatggacc accaggtcgt gatggtgcag     60
caggagtgaa aggagatcgt ggtgaaaccg gtgcagtagg tgcacctggt gcgccaggtc    120
cgccaggtag ccctggtcca gccggtccta ccggaaaaca agggqatqaga ggagaagcag    180
gagcacaggg tccgatgggt ccgtcaggtc cggcgggtgc acgtggtatt cagggtccgc    240
agggtccgcg tggtgataaa ggtgaagcag gtgaaccggg ggaaagagga ttaaaagggc    300
atcgtggttt tacgggtctg cagggtctgc ctggtccgac tggtccgacg ggtgatcagg    360
gtgcaagcgg tccggcaggt ccgagcggac ctcgtggacc tccggtgcct gtgggtccta    420
gtggtaagga tggggcaaat ggtattcctg gtcctattgg tccgccgggt ccgcgtggga    480
gatcaggtga aaccggaccg gca                                            503

SEQ ID NO: 19           moltype = DNA  length = 270
FEATURE                 Location/Qualifiers
source                  1..270
                        mol_type = other DNA
                        organism = synthetic construct
SEQUENCE: 19
ggtagcccag gtccagcagg tccgacaggt aaacaaggag atcgtggtga agcaggagca     60
caaggaccaa tgggtccaag cggtccggca ggtgcaagga gtattcaagg gccgcaaggg    120
ccacgcggtg ataaagggga agcaggtgaa ccaggtgaga gagggttaaa aggacatcgt    180
ggatttacag gactgcaggg tttaccaggt ccgccgggac cgagcggaga tcaaggtgca    240
agcggtccgg cgggtccgag tggtcctcgt                                     270

SEQ ID NO: 20           moltype = DNA  length = 1080
FEATURE                 Location/Qualifiers
source                  1..1080
                        mol_type = other DNA
                        organism = synthetic construct
SEQUENCE: 20
ggagctaggg gtatccaggg tccgcagggc ccgcggggga ataaagggga agcgggtgaa     60
ccgggtgaac gtggcttgaa gggtcatcgt ggcttcaccg gctgcaggg cttgccgggt    120
ccgcaggtc cgtccggtgc ccgtggcatc cagggaccgc aaggaccggc tggagacaaa    180
ggtgaagcgg gtgaaccggg tgagcgcggc tcaagggcc accgcggctt caccggtttg    240
caaggcctgc cgggtccgcc gggtccgtcg gccgcgcgtg gtattcaagg cccgcaaggt    300
ccacgcggcg acaaaggcga agcgggtgag ccgggcgaac gcggcctgaa aggtcaccgc    360
ggttttacgg gtctgcaggg cctgccgggt ccacccgggtc cgagcggtgc tcgcggcatc    420
cagggcccgc aaggtccgcc tggtgataag ggtgaggcgg gtgagccggg agaacgtggt    480
ctgaagggtc atagaggctt caccggtctg caaggtctgc cggtccacc gggcccgagc    540
ggcgctaggg gcattcaggg ccccgcaggg ccgcgtggtg ataagggcga ggccggtgag    600
ccgggcgaac gtggtttaaa aggtcatcgc ggcttcacgg gcctccaagg tctgcctggc    660
ccaccgggtc cgagcggcgc gcgtggcatt caaggcccac agggtcctcg tggcgacaaa    720
ggcgaggcgg gtgagccggg tgaaccgggt ctgaaaggcc atcggtttt taccggttg    780
caaggcctgc cgggccccacc gggcccgtcc ggtgcacgtg gcattcaggg tccgcagggt    840
ccgcgtggcg acaagggcga agctggtgag ccgggtgagc gcggcttaag ggtcaccgt    900
ggctttaccg gttacaagg tttgccgggc cctccgggtc caagcggtgc acgtggtatc    960
caaggcccac agggtccgcg tgggggataaa ggcgaagcgg gtgaaccggg cgagcgcggg   1020
ctgaagggtc accgtggctt tactggcctg caggggtctgc cgggtccacc gggtccgtct   1080
```

```
SEQ ID NO: 21            moltype = DNA   length = 1083
FEATURE                  Location/Qualifiers
source                   1..1083
                         mol_type = other DNA
                         organism = synthetic construct
SEQUENCE: 21
ggatcacccg ggccggcggg cccgaccggt aaacagggtg accgcggtga ggcgggtgcg    60
caggggccga tgggtccgag cggtccggct ggtgcgcgtg gtatccaggg accgcagggc   120
ccacgcggtg ataaaggcga agcaggcgaa ccgggtgagc gcggtttgaa gggccaccgt   180
ggttttaccg gtctgcaggg cctgccgggc ccgccgggtc cgtcaggcga tcagggtgct   240
agcggtccgc ctggcccgtc cggccgcgc ggtagcccgg gccagctggg cccgactggt    300
aaacagggcg accgtggcga ggccggtgcc caaggcccta tgggcccgag cggtccggca   360
ggcgcgcggg gcatccaggg tccgcaagga ccaaggcga acaagggtga ggcaggcgag    420
cctggcgaac gtggcctgaa gggtcaccgc ggttttaccg gtctccaagg tctgcctggt    480
ccaccgggtc cgtctggaga tcaaggcgcc agcggcccg cgggtccctc cggtccgcgt    540
ggcagcccgg gtccggcagg accaacgggt aagcagggta tagaggcga agccggtgcg    600
cagggcccga tgggtccttc ggctccagcg ggggcgcgtg gcattcaagg tccgcagggc   660
ccgcgtggtg acaaaggtga ggcgggcgaa ccgggcgagc gcggcttgaa gggtcatcgt   720
ggattcaccg gtttgcaagg cctgccgggc ccccgggcc cgagcggtga ccaaggagct    780
agcgggccgc ctggtccgtc gggcccgcgt ggcagtccgg gtccggcggg cccaacgggc   840
aagcaaggag atcgtggtga ggcggtgcg caaggtcgga tgggtccgtc tggtccgggc    900
ggtgcacgcg gtattcaagg tccgcagggg ccgcgtggtg ataaaggaga agcaggcgaa   960
ccgggtgaac gtggtctgaa aggtcatcgt ggcttcaccg gctgcagggg tttaccaggt   1020
ccaccgggtc cgtctggcga ccagggtgcc agcggtccgg cgggcccgtc cggaccgcgt  1080
taa                                                                1083

SEQ ID NO: 22            moltype = DNA   length = 900
FEATURE                  Location/Qualifiers
source                   1..900
                         mol_type = other DNA
                         organism = synthetic construct
SEQUENCE: 22
ggaccccaag gggcgcgtgg ttttccgggc accccgggcc tgccgggcgt gaagggtcac    60
cgcggttatc cggggctgga tggcgcgaag ggtccgcaag gtgctcgcgg ttttcccggga   120
accccgggcc tgccgggcgt taaaggtcat cgtggttatc cgggtctgga tggtgcgaag   180
ggcccacagg gtgcgcgtgg ttttccgggc accctgggc tccgggtgt gaaaggtcac     240
agaggttacc cgggcctgga tggtgccaaa ggtccgcaag gtgcgcgtgg ttttccgggc   300
acgccgggct tgccgggtgt taaaggtcac cgtggttatc cggggcgcaaa              360
ggtcctcagg gtgcacgcgg cttcccgggt acgccgggcc ttccgggcgt gaagggcac    420
cgcggttatc cgggtttgga cggtgccaag ggtccgcagg gtgcgcgtgg attcccggga   480
accccaggcc tgccaggtgt gaagggccac cgtggctacc cgggcttgga cggtgctaaa   540
ggaccgcagg gcgcacgtgg ctttccgggt accccgggc tgcctggcgt caagggccac   600
cgtggttacc cgggcctgga tggtgcaaaa ggcccacagg gtgcccgtgg ttttccgggt   660
actccgggcc tgccgggcgt aaaaggccat cgcggttacc cgggtttgga tggcgctaaa   720
ggcccacaag gtgctagagg gttccctggc accccgggtc tgccgggcgt taaaggccat   780
cgtggttacc cgggcttgga cggcgcgaag gtccgcaag gcgcgcgtgg ttttccgggt    840
accccgggtc tgccaggcgt taaaggtcac cgcggttacc cgggtttaga cggtgcgaaa   900

SEQ ID NO: 23            moltype = DNA   length = 972
FEATURE                  Location/Qualifiers
source                   1..972
                         mol_type = other DNA
                         organism = synthetic construct
SEQUENCE: 23
ggtgctaggg gattcccggg aaccccgggt ctgccaggcg tgaaaggtca ccgcggttac    60
ccgggcctcg acggcgcgaa gggtgcccgt ggttttccgg gaaccccggg cttgccaggt   120
gtcaagggcc atcgtggtta cccgggtctc gatggtgcaa agggtgcgag aggcttcccg   180
ggcacccgcg gcctgccagg ggtgaaaggc cacagaggct atcctggctt ggatggtgcc   240
aagggtgcac gtggattccc gggcactccg gtctctgcgg gcgtgaaggg ccaccgcggt   300
tatccgggcc tggacggtgc taaaggcgcg cgtggctttc cggtacgcc gggcttgcca    360
ggtgttaagg gccaccgtgg ctaccgggg ctggatggtg ccaaaggtgc tgcggtttc     420
ccgggaaccc cgggtctgcc tggcgtgaag gtcatcgtg ttacccggg cttggacggc    480
gctaagggtg cgcgtggttt tccgggcacc ccgggtctgc cgggggtgaa aggtcaccgg   540
ggttatcccg gtctgatgg tgcgaagggt gcgcgtggct cccgggcac ccgggcctg    600
ccgggtgtta aggtcatcg tggttacccg ggcctggatg gtgccaaggg cgctcgcggt   660
tttccgggca cgccagggttt accggggggtc aaaggccatc gtggctatcc gggtttagat  720
ggcgcgaaag gcgcacgcgg attcccggga accccgggcc tgccctggcgt taaaggccac  780
cgcggttacc cgggccttga cggcgcgaaa cggcgcgaaa gggtttccgg caccccggtt    840
ctgccggtg ttaaaggtca ccgtggctat ccgggtctgg acggtgcaaa aggtgcacgt    900
ggtttccggg ggactccggg cctgccgggt gttaagggcc atcgtggtta cccgggtttg   960
gacggtgcga ag                                                      972

SEQ ID NO: 24            moltype = DNA   length = 1008
FEATURE                  Location/Qualifiers
source                   1..1008
                         mol_type = other DNA
                         organism = synthetic construct
SEQUENCE: 24
```

```
ggatttcccg ggactccagg tctgccggc gtgaagggcc accgcggtta tccgggcttg    60
gacggtgcga aaggcttccc gggcacgcca ggcttacctg gtgtgaaggg ccatcgtggt   120
tacccgggc tggatggtgc gaagggtttt ccgggcaccc cggtctgcc gggcgtaaag   180
ggccaccgcg gttatccggg cctggacggt gcaaaaggtt ttccgggcac cccgggcctg   240
ccgggtgtga agggccaccg cggttacccg ggtttggacg gtgccaaggg attcccaggt   300
acgccgggtc tgccgggggt gaagggccat agaggctacc cggcttgga tggtgcgaaa   360
ggtttcccgg gaaccctgg tctgccgggc gttaagggcc accgtggtta tccgggtctg   420
gatggcgcga aaggttttcc gggaacccca ggtctgccgg gcgttaaagg tcatcgtggt   480
tacccgggc tcgatggtgc caaaggtttt ccgggcaccc cggtctgcc gggcgtcaaa   540
ggtcaccgcg gttatccggg tctggatggt gcgaaaggct tcccgggaac ccgggcctg   600
cctggcgtga aaggccatcg tggttatccg gtctggatg gtgctaaagg attcccggga   660
accccgggc tgccgggcgt taagggtcac cgtggttacc cggcctgga tggcgctaag   720
ggtttcccgg gtacgcccgg cctgccgggc gtcaaaggtc atcgtggtta cccgggttta   780
gacggcgcaa aaggtttccc gggaacccg gtctgccgg gtgttaaggg ccatcggtgc   840
tatccgggct tggacggtgc aaagggtttt cctggtactc caggcttgcc cggcgttaag   900
ggccaccgtg gttacccggg tttggacggc gctaaaggct ttccgggaac cccgggtctt   960
ccgggcgtga aggtcaccg tggttacccg ggtctggacg gcgcgaag                1008

SEQ ID NO: 25           moltype = DNA   length = 1008
FEATURE                 Location/Qualifiers
source                  1..1008
                        mol_type = other DNA
                        organism = synthetic construct
SEQUENCE: 25
ggaacacccg ggctgccggg tgttaagggc catcgtggct acccgggttt ggacggtgcg    60
aaaggcaccc ctggcctgcc gggtgtcaaa ggccatcgtg gttatccggg tctcgacggt   120
gcgaagggta ccccaggact gccgggtgtt aaaggtcacc gcggttaccc gggtctggac   180
ggcgcaaaaag gtactccagg cctgccgggc gtgaagggtc atcgtggtta cccgggcctg   240
gacggcgcga agggcacccc gggcttaccg ggcgtgaaag gccatcgtgg ttatccgggg   300
ttggatggcg caaagggtac cccggtctg cctggtgtta agggcaccg cggttatccg   360
ggcctggatg gtgcgaaagg tacgccggga ttgcccgggtg tgaagggtca tcgtggttac   420
ccgggtctgg atggtgccaa aggcacgcca ggcttccgg cgtcaaggg ccaccgcgt   480
tacccggcc tggatggtgc gaaggtacc cggtttgc ctggtgttaa gggccaccgc   540
ggttatcctg gtttggacgg cgcgaaagga accccgggcc tgccgggtgt taaaggccat   600
cgtggctacc cgggtctgga cggcgctaaa ggcactccgg gtctgccggg cgtgaaggc   660
caccgtggtt atccgggttt agacggcgcg aaaggcaccc caggcctgcc gggtgtcaag   720
ggtcaccgcg gttacccggg tctggatggt gccaagggca cccccgggctt gccgggcgtg   780
aaaggacatc gtggttaccc gggcctggat ggtgctaagg gcacgccagg tcttccgggt   840
gtgaaaggtc accgtggtta tccgggtctg gacggtgcaa agggaacccc ggggctgccg   900
ggcgtaaaag gccacagagg ttatccgggt cttgatggtg cgaagggcac cccgggcctg   960
ccgggcgtta aaggtcaccg tggttacccg ggtttggacg gcgctaaa              1008

SEQ ID NO: 26           moltype = DNA   length = 936
FEATURE                 Location/Qualifiers
source                  1..936
                        mol_type = other DNA
                        organism = synthetic construct
SEQUENCE: 26
ggagaaaggg ggttgaaggg acaccgcggt tttactggtt tgcaaggcct gccgggccct    60
ccgggtccgt ctggcgatca gggtgcaagc ggccccggcgg gtccgtcggg cccgcgtggt   120
gagcgcggtc ttaagggcca tcgtggtttc accggtttac aaggtctgcc gggcccggtc   180
ggtccgagcg gtgatcaagg gcctccggtt ccgctggcc cgtccggccc aagaggcgaa   240
cgtggtctga aggtcatcg tggattcacc ggactgcagg gtctgcctgg tccgcctggt   300
ccgtcaggcg accaaggtgc gagcggtccg cgggtccgt ccggtccgcg tggtgaacgt   360
ggtctgaaag gccaccgcgg cttcaccggt ttgcaaggcc tgccaggccc accgggtccg   420
tctggcgacc agggagccag cggtccggct ggcccatctg gcccacgcgg cgagcgcggt   480
ctgaaaggcc accgtggctt tacgggcttg cagggtctcc cggcccacc gggcccgagc   540
ggtgatcagg tgccagcgg accggcaggc ccctctggtc cgcgtggtga acgtggcctg   600
aaaggtcatc gtggttttac cggtttacag ggcctgccag gtccccggg tccgtccggc   660
gaccagggcg caagcggtcc ggctgggccg agcggtccgc gtggcgaagg cggccttaag   720
ggccacagag gcttcacggg tctgcaaggt ttgccgggtc cgcctggccc gtcgggcgat   780
cagggcgcga gcgccccggc gggtccgagc ggtccgcgtg gcgagcgtgg tctgaagggt   840
caccgcggtt ttaccggtct gcaaggtctg ccgggtccgc ctggcccgag cggcgaccag   900
ggagcgagcg gtccggcggg tccgagtggt ccgcgt                             936

SEQ ID NO: 27           moltype = DNA   length = 990
FEATURE                 Location/Qualifiers
source                  1..990
                        mol_type = other DNA
                        organism = synthetic construct
SEQUENCE: 27
ggggaaaggg gactcaaagg tcaccgcggt ttcacgggcc ttcaaggtct gccgggtcct    60
ccgggtccga cgccgaccca aggtgcgtct ggcccagcgg tgagcgtgg tttaaaaggc   120
caccgcggtt tcaccggcct gcagggttta ccgggtccga ctggcccgag cggtgatcaa   180
ggtgcaagcg gcccggcagg cgaacgcggt ctgaaaggcc atagaggttt taccggcctg   240
cagggcttgc cggccgcc gggcccgagt ggcgatcaag gtgcttccgg cccgcggggt   300
gaacgtggc tgaaggggcca tcgtggcttt accggtctgc agggcctgcc aggtccgccg   360
ggcccgtctg gcgaccaggg tgcgagcggt ccagccggtg agcgcggctt gaaggcccac   420
cgcggcttta cggtttgca aggtctgcct ggtccgccgg gcccgtcagg cgatcaaggg   480
```

```
                                        -continued
gcgagcggcc cggcgggtga acgtggtctg aaaggtcatc gtggattcac cggcctgcag    540
ggtctgccgg gccgccgg cccgtccggt gaccagggtg cttccggtcc ggctggtgag      600
cgcggtctta agggacaccg tggcttcacc ggtctgcagg gcttgccggg tcctccgggg    660
ccgagcggcc accaggtgc gtccggcccg gcggtgaac gtggtctgaa gggccaccgt      720
ggttttaccg gcttgcaagg tctgccgggt ccaccggtc cgtctggcgg tcagggagcc     780
agcggtccgg caggcgagcg tggttttgaag gtcaccgtg gattcaccgg cctgcagggg    840
ctgccgggcc cgccgggtcc gtcgggcgat cagggagcga gcggtccggc aggtgagcgt    900
ggtctgaaag gccatcgtgg cttcactggt ttgcaaggcc tgcctggccc accgggtccg    960
agcggtgacc agggtgccag cggtccggct                                     990

SEQ ID NO: 28           moltype = DNA   length = 972
FEATURE                 Location/Qualifiers
source                  1..972
                        mol_type = other DNA
                        organism = synthetic construct
SEQUENCE: 28
ggagaaaggg ggcttaaggg ccatcgtggc ttcacgggtt tgcagggcct gccgggccca    60
ccgggtccga gcggcgatca aggcgagcgg ggcctgaaag gtcatcgtgg ctttaccggt   120
ttgcagggcc tgccgggccc accgggaccg agcggtgatc aggggagcg tggtctgaaa    180
ggtcatcgtg gttttaccgg tctgcaggt ttgccgggtc ctccgggtcc gtctggcgac    240
caaggtgagc gtggtctgaa aggtcatcgt ggtttcaccg gtttacaagg cctgccgggc   300
ccaccgggtc cgagcggtga ccaaggcgag cgtggcctga aaggccaccg cggttttacc   360
ggtcttcagg gtctgccggg cccaccgggt cccagcggtg accagggtga acgcggtctg   420
aagggtcaca gaggcttcac cggtctccaa ggcttaccgg gtccgccggg cccgagcggt   480
gatcaggcg aacgtggtct gaaggccac cgtggcttta cgggtctgca aggcctgccg     540
gtccggcgtc gtccggcgg cgaccagggt gagcgggtt tgaagggcca ccgtggattc    600
accggcctgc agggcctgcc gggaccgcct ggtccgtcag gtgatcaggg tgagcgcggt   660
ctcaagggtc atcgtggttt taccggttta caagttttgc cggtccgcc tggcccgtct    720
ggtgatcaag gcgaacgtgg tctgaaaggc caccgcggct tcactggtct gcagggcttg   780
ccgggcccac cgggtccgtc cggcgatcaa ggcgaacgtg gtctgaaggg tcaccggag    840
ttcacgggcc tgcagggcct gccgggtccg ccaggtccgt ccggcgacca gggcgaacgc   900
gggctgaaag gtcaccgtgg ctttaccggt ttgcaaggac tgccgggtcc gccgggccc    960
agcggcgacc ag                                                        972

SEQ ID NO: 29           moltype = DNA   length = 1008
FEATURE                 Location/Qualifiers
source                  1..1008
                        mol_type = other DNA
                        organism = synthetic construct
SEQUENCE: 29
ggagaaaggg ggctgaaggg tcaccgtggt tttaccggtt tgcaaggttt gccgggtccg    60
ccgggtgagc gcggcctgaa gggtcatcgt ggcttcaccg gcctgcaagg cctgccgggt   120
ccgccgggtg agcgtggtct caaggtcat cgtggcttta ccggtttaca gggtctgccg     180
ggcccaccgg gcgagcgcgg tctgaaaggc catcgtggat tcaccggcct gcagggcttg   240
ccgggtccac cgggcgaaag aggcttaaaa ggtcaccgtg gttttacggg tctgcaaggt   300
ctgccgggtc cgccgggtga acgtggcctt aagggtcacc gcggcttcac tggtctgcag   360
ggttttgccgg gtccgcctgg tgaaaggggt ctgaaaggcc atcgtggttt caccggtctg   420
cagggcctgc cgggcccacc gggtgagaga ggcttgaagg gtcaccgtgg ttttacggg     480
ctgcagggtc tgccgggccc gccgggtgag cgcggtctta agggcaccg tggattcacc    540
ggccttcaag gtctgccggg tccgccgggg gagcgtggcc tgaaaggtca tcgcggcttc   600
accggttgc aaggtttgcc aggcccaccg ggcgaactg gcctgaaaag gcaccgtggc     660
tttactggtt tgcagggcct gccgggcccg ccgggcgagc gcggtttgaa gggccaccgt   720
ggtttcacgg gcctgcaagg tctgccgggc cctccgggag aacgcggtct gaaaggtcac   780
cgtggcttca ccggcctgca gggtctaccg gtccaccgg gcgagcgcgg actgaaaggt    840
catccggcct tcaccggtct gcagggcctg ccgggtccgc cgggtgaacg tggcctgaaa    900
ggccaccgcg gttttaccgg ttacaagc ttgccgggtc cgccgggtga acgtggcttg      960
aagggccatc gtggctttac cggtcttcag gggctgccgg gccgccgct                1008

SEQ ID NO: 30           moltype = AA    length = 336
FEATURE                 Location/Qualifiers
source                  1..336
                        mol_type = protein
                        organism = synthetic construct
SEQUENCE: 30
GTPGLPGVKG HRGYPGLDGA KGTPGLPGVK GHRGYPGLDG AKGTPGLPGV KGHRGYPGLD    60
GAKGTPGLPG VKGHRGYPGL DGAKGTPGLP GVKGHRGYPG LDGAKGTPGL PGVKGHRGYP   120
GLDGAKGTPG LPGVKGHRGY PGLDGAKGTP GLPGVKGHRG YPGLDGAKGT PGLPGVKGHR   180
GYPGLDGAKG TPGLPGVKGH RGYPGLDGAK GTPGLPGVKG HRGYPGLDGA KGTPGLPGVK   240
GHRGYPGLDG AKGTPGLPGV KGHRGYPGLD GAKGTPGLPG VKGHRGYPGL DGAKGTPGLP   300
GVKGHRGYPG LDGAKGTPGL PGVKGHRGYP GLDGAK                             336

SEQ ID NO: 31           moltype = AA    length = 9
FEATURE                 Location/Qualifiers
source                  1..9
                        mol_type = protein
                        organism = synthetic construct
SEQUENCE: 31
GTPGLPGVK                                                            9
```

```
SEQ ID NO: 32          moltype = AA   length = 12
FEATURE                Location/Qualifiers
source                 1..12
                       mol_type = protein
                       organism = synthetic construct
SEQUENCE: 32
GTPGLPGVKG HR                                                              12

SEQ ID NO: 33          moltype = AA   length = 9
FEATURE                Location/Qualifiers
source                 1..9
                       mol_type = protein
                       organism = synthetic construct
SEQUENCE: 33
GYPGLDGAK                                                                   9

SEQ ID NO: 34          moltype = AA   length = 21
FEATURE                Location/Qualifiers
source                 1..21
                       mol_type = protein
                       organism = synthetic construct
SEQUENCE: 34
GYPGLDGAKG TPGLPGVKGH R                                                    21
```

COLLAGEN AND USE THEREOF

CROSS-REFERENCE TO RELATED APPLICATIONS

This application is a continuation of International Patent Application No. PCT/CN2023/134277 filed on Nov. 27, 2023 which claims the priority benefit of the Chinese Patent Application No. 202310537499.9, filed on May 12, 2023, titled "POLYPEPTIDE AND USE THEREOF". The content of the aforementioned application is incorporated herein by reference.

SEQUENCE LISTING

A sequence listing contained in the file named "C23W5040.01US.TCA" which is 46,309 bytes and created on Sep. 26, 2024, is filed electronically herewith and incorporated by reference in its entirety.

TECHNICAL FIELD

The present disclosure belongs to the field of synthetic biotechnology, and specifically relates to human body structural materials and biosynthetic preparation methods thereof.

BACKGROUND OF THE INVENTION

Collagen is a type of protein widely distributed in human connective tissue and is also the most abundant protein in the human body, accounting for 25% to 35% of the total protein. It has been found that there are at least 28 collagen subtypes in the human body, which are located in different tissues and organs.

Type II collagen, a high-molecular protein, is mainly found in cartilage tissue, the vitreous body, and cornea, the filamentous collagen fiber of which is interwoven with elastin and polysaccharide proteins to form a network structure, also known as complex bone collagen. Type II collagen is an essential component for cartilage and bone formation, bone growth, and maintenance of mature cartilage, so non-denatured collagen can be used as a structural and functional component of the cartilage.

Type II collagen, as the main component of the articular cartilage matrix, together with lubricating components such as hyaluronic acid and proteoglycans, protects the cartilage from wear and tear. As age increases, the synthesis rate of collagen gradually decreases, the loss of collagen intensifies, articular cartilage degenerates, and the friction between bones intensifies, which can trigger inflammation in the joints. At present, the common treatment method for osteoarthritis is to consume collagen, but its protein utilization rate is low, resulting in slow cartilage regeneration, which is not beneficial to the patient's recovery and affects the process and efficiency of the treatment. Due to the unsatisfactory efficacy of current treatment methods, patients often have to choose artificial joint replacement, which is not only expensive, but may also lead to catastrophic complications such as postoperative thrombosis, and infection after replacement leading to amputation.

However, the collagen material currently used as the cartilage is mainly from animal cartilage extraction. The immunogenicity of animal-origin collagen cannot be eliminated and the impurity removal and extraction processes thereof are still relatively complicated, thus, it is difficult to ensure the triple helix structure of collagen and cannot be used for large-scale production.

At the same time, the animal-origin immune response is also an important reason that limits the application of collagen. With the growing growth of our country's collagen industry, the use of biosynthetic pathways to obtain collagen has become increasingly mature, especially humanized collagen, which has been at the forefront of the world. In 2021, the National Medical Products Administration made a naming and classification of the biosynthetic collagen, wherein the recombinant humanized collagen refers to the full-length or partial amino acid sequence functional region encoded by the specific type of the human collagen gene prepared by DNA recombinant technology, or the combination of the functional regions containing the human collagen function.

The traditional method of producing the collagen is to use acid, alkali, and enzymatic hydrolysis to process the animal source tissues and extract the collagen derivatives. The collagen extracted by these methods has lost its original biological activity and thus cannot be applied in the biomedical field to play a real role. With the development of modern technology, some extraction methods of impurity removal and enzymatic extraction for animal cartilage to obtain the non-denatured type II collagen have emerged at home and abroad. Although the collagen prepared by these methods can be used for cartilage repair, the time for impurity removal and extraction is long, the product purity is low, and the product stability is poor, so it is not beneficial to large-scale production. Given the defects of the existing technology, some companies have proposed using the *Pichia pastoris* as a host strain to prepare the type II collagen for cartilage repair. However, this collagen is not humanized collagen and therefore has a certain immunogenic response.

Therefore, there is an urgent need for a recombinant type II humanized collagen that can be directly injected into the human body and does not cause an immunogenic response, to be used as a human body structural material applied for cartilage repair.

SUMMARY OF THE INVENTION

Human body structural materials are mainly structural proteins including collagen, which have complex structures and precise function and are of great significance for the repair and regeneration of the human tissue. However, they are not easy to obtain using conventional production methods. The present disclosure uses synthetic biology and structural biology technology to develop a macromolecular functional protein that has the triple helix structure of the human type II collagen and can perform the function of the human collagen. The inventors conducted a large-scale screening of functional regions. The first was the sequence screening. The Gly-X-Y repetitive gene sequence in the helical region of the natural type II collagen contains a large number of charged amino acids. These charges bind to the cell through interactions, so the regions that do not contain these important charge motifs are excluded. The second was to use computer-assisted protein structure prediction methods to help screen out the potential helical functional regions that have the most interchain hydrogen bond structures and can best stabilize trimer aggregation. The third was to use the prediction method based on the protein expression properties to screen out the functional regions of the human type II collagen with the highest protein expression, easy purification, and good stability. The fourth was to optimize the amino acid fragments of these regions by directly connecting them through n repetitions (the repetitions are to ensure that the molecular weight of the recombinant type II humanized collagen is within a certain range for easy purification and stability).

The present disclosure includes the core functional region screening, synthesis process, and application scenarios of the recombinant type II humanized collagen. The present disclosure for the first time develops a functional region screening and protein synthesis process for the recombinant type II humanized collagen that can be directly injected into the human body and can be used for cartilage repair.

The present disclosure is based in part on the following unexpected findings by the inventors. Compared with other recombinant type II humanized collagen, the recombinant type II humanized collagen HC2B-A10 has a higher expression level when recombinantly expressed, is easier to separate and purify, and has excellent cell adhesion effect compared with the bovine type I collagen.

In one aspect, the present disclosure provides a collagen or polypeptide comprising a plurality of repeating units comprising the amino acid sequence as shown in SEQ ID NO: 15 (gtpglpgvkghrgypgldgakgtpglpgvkghrgypgldgak) or the variant thereof having 80%, 85%, 90%, 91%, 92%, 93%, 94%, 95%, 96%, 97%, 98%, or 99% identity thereto, wherein each repeating unit is directly connected or separated by one or more amino acid residues. In one embodiment, the repeating unit may be an amino acid sequence obtained by mutation (substitution, insertion, deletion or addition) of one or more amino acid residues in the amino acid sequence of SEQ ID NO: 15.

In one embodiment, the number of the repeating unit is 1-20. In one embodiment, the number of the repeating unit is 6-10. In one embodiment, the number of the repeating unit is 2, 3, 4, 5, 6, 7, 8, 9, 10, 11, 12, 13, 14, 15, 16, 17, 18, 19 or 20.

In one embodiment, the collagen or polypeptide comprises the amino acid sequence as shown in SEQ ID NO: 10. In one embodiment, the collagen or polypeptide comprises the amino acid sequence as shown in SEQ ID NO: 10 or the amino acid sequence obtained by mutation (substitution, insertion, deletion or addition) of one or more amino acid residues of the amino acid sequence of SEQ ID NO: 3 or 10, or the variant having 80%, 85%, 90%, 91%, 92%, 93%, 94%, 95%, 96%, 97%, 98%, or 99% identity with the amino acid sequence as shown in SEQ ID NO: 10. In one embodiment, when the collagen or polypeptide sequence is mutated, the resulting collagen or polypeptide retains the functions of the present disclosure, such as cell adhesion, cartilage repair ability, etc.

In one aspect, the disclosure provides a polynucleotide encoding the collagen or polypeptide described herein.

In one embodiment, the polynucleotide comprises the nucleotide sequence set forth in SEQ ID NO: 29.

In one aspect, the disclosure provides a nucleic acid comprising the polynucleotide described herein. Optionally, the nucleic acid also comprises the nucleotides encoding a purification tag, such as His tag, GST tag, MBP tag, SUMO tag, or NusA tag. Optionally, the nucleic acid further comprises nucleotides encoding a leader sequence.

In one aspect, the disclosure provides a vector comprising the polynucleotide described herein or the nucleic acid described herein.

In one embodiment, the vector is an expression vector. In one embodiment, the vector comprises an expression control element, such as a promoter, terminator, and/or enhancer, operably linked to the polynucleotide or nucleic acid.

In one aspect, the disclosure provides a host cell comprising the polynucleotide described herein, the nucleic acid described herein, or the vector described herein. In one embodiment, the host cell is a bacterial, fungal, or animal cell. In one embodiment, the bacterium is *E. coli*. In one embodiment, the fungus is yeast, such as *Saccharomyces cerevisiae*.

In one aspect, the disclosure provides a method of producing the collagen or polypeptide described herein, comprising:
  (1) Cultivate the host cell described herein under appropriate culture conditions;
  (2) Harvest the host cell and/or culture medium comprising the collagen or peptides; and
  (3) Purify the collagen or peptides.

In one aspect, the disclosure provides a composition comprising the collagen or polypeptide described herein. In one embodiment, the composition is a kit. In one embodiment, the composition is one or more of a biological dressing, a human bionic material, a plastic surgery material, an organoid culture material, a cardiovascular stent material, a coating material, a tissue injection filling material, an ophthalmic material, an obstetrics and gynecology biomaterial, a nerve repair regenerative material, a liver tissue material and a blood vessel repair regeneration material, a 3D printed artificial organ biomaterial, a cosmetic raw material, a pharmaceutical excipient, and a food additive. In one embodiment, the composition is an injectable or oral composition.

In one embodiment, the composition is a composition for cartilage repair. In one embodiment, the composition is an injectable composition for cartilage repair.

In one aspect, the disclosure provides a method for increasing cell adhesion, comprising contacting the cell with the collagen or polypeptide described herein, the polynucleotide described herein, the nucleic acid described herein, the vector described herein, the host cell described herein, and/or the composition described herein.

In one aspect, the disclosure provides use of the collagen or polypeptide described herein, the polynucleotide described herein, the nucleic acid described herein, the vector described herein, the host cell described herein, and/or the composition described herein in the manufacture of the kits, which are used for increasing cell adhesion or cartilage repair. In one aspect, the disclosure provides use of the collagen or polypeptide described herein, the polynucleotide described herein, the nucleic acid described herein, the vector described herein, the host cell described herein, and/or the composition described herein in one or more of a biological dressing, a human bionic material, a plastic surgery material, an organoid culture material, a cardiovascular stent material, a coating material, a tissue injection filling material, an ophthalmic material, an obstetrics and gynecology biomaterial, a nerve repair regenerative material, a liver tissue material, and a blood vessel repair regeneration material, a 3D printed artificial organ biomaterial, a cosmetic raw material, a pharmaceutical excipient, and a food additive.

Advantages of the disclosure include:
1. The present disclosure provides the core functional region and amino acid sequence of the recombinant type II humanized collagen.
2. The present disclosure successfully synthesizes the recombinant type II humanized collagen that can be injected into the human body for the first time for cartilage repair.
3. The amino acid composition of the recombinant type II humanized collagen produced is 100% identical to the corresponding part of the amino acid sequence of natural collagen, and will not cause immune rejection or allergic reactions when applied to the human body.

4. The preparation method of this disclosure is simple and can produce high-yield recombinant type II humanized collagen on a large scale.

5. In terms of expression, isolation, and purification effects, the recombinant type II humanized collagen HC2B-A10 achieves the best results compared with other recombinant type II humanized collagen.

6. The recombinant type II humanized collagen of the disclosure has better bioadhesion activity, that is, the recombinant type II humanized collagen HC2B-A10>bovine type I collagen.

DETAILED DESCRIPTION OF THE INVENTION

Figure 1:
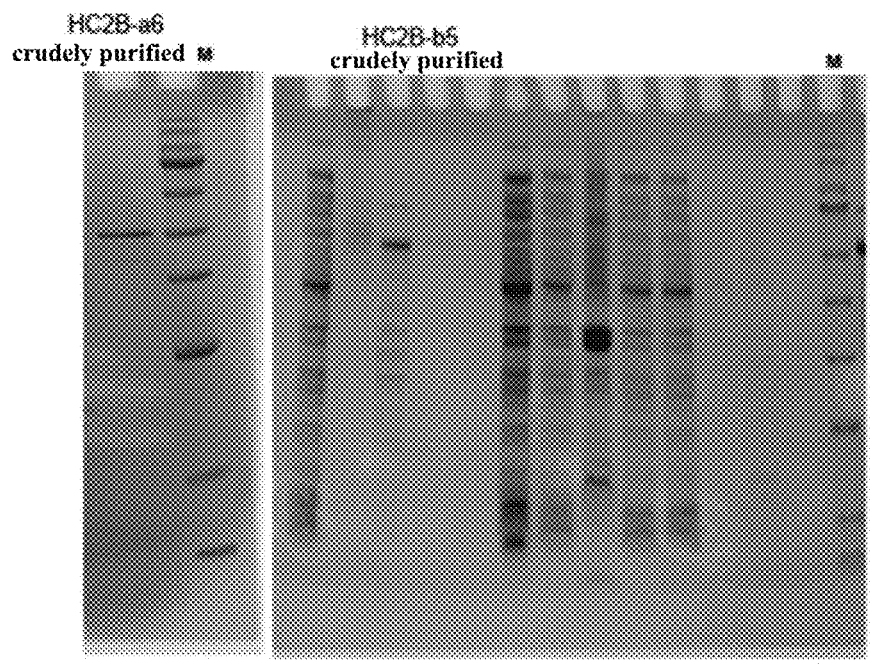
FIG. 1: Crude purification of the recombinant type II humanized collagens HC2B-a6 and HC2B-b5.

In order to make the purpose, technical solutions, and advantages of the present disclosure clearer, the technical solutions in the examples of the present disclosure will be clearly and completely described below in combination with the examples of the present disclosure. Obviously, the described examples are partial examples of the present disclosure, rather than all of the examples. Based on the examples of the present disclosure, all other examples obtained by ordinary technicians in this field without making any creative work fall within the scope of protection of the present disclosure.

Recombinant collagen is a new type of biological material with the same or similar amino acid sequence as human collagen, which is screened and prepared by using cutting-edge structural biology, genetic engineering, and other technologies and using the genetic coding of the functional region of a specific type of human collagen as a template.

As used herein, "polypeptide" refers to a plurality of amino acid residues linked by peptide bonds. In this disclosure, the collagen, recombinant collagen, recombinant type II humanized collagen, or polypeptide can be used interchangeably.

In this disclosure, the collagen or polypeptide may comprise one or more repeating units comprising the amino acid sequence as shown in SEQ ID NO: 15 or the amino acid sequence after mutation (substitution, addition, insertion, or deletion) of one or more amino acid residues in the amino acid sequence. The number of the repeating unit may be 1-20. For example, the number of the repeating unit is 2, 3, 4, 5, 6, 7, 8, 9, 10, 11, 12, 13, 14, 15, 16, 17, 18, 19 or 20. In particular, the mutations may be substitutions, such as conservative amino acid substitutions. The amino acid sequence of SEQ ID NO: 15 is gtpglpgvkghrgypgld-gakgtpglpgvkghrgypgldgak. Each repeating unit may be directly linked or separated by one or more amino acid residues.

In the case where the collagen or polypeptide sequence is mutated or there is a spacer sequence, the resulting collagen or polypeptide retains the functions of the present disclosure, such as cell adhesion, cartilage repair ability, etc.

The collagen or polypeptide of the disclosure may be synthetic or may be recombinantly expressed. In the case of recombinant expression, the collagen or polypeptide of the disclosure may be encoded by the polynucleotide. The polynucleotide can be codon-optimized for the host cell in which expression is performed. The polynucleotide encoding the collagen or polypeptide can be operably linked to the expression control element, such as the promoter, terminator, and/or enhancer to constitute nucleic acid or expression cassettes. The nucleic acid may also comprise nucleotides encoding a purification tag, such as a His tag, a GST tag, an MBP tag, a SUMO tag, or a NusA tag, or nucleotides encoding a leader sequence to facilitate purification or secretion of the collagen or polypeptide.

As used herein, the term "vector" is a nucleic acid vehicle into which a polynucleotide can be inserted. When a vector can express the protein encoded by the inserted polynucleotide, the vector is called an expression vector. The vector can be introduced into the host cell by transformation, transduction, or transfection, so that the genetic material elements it carries are expressed in the host cell. The vector is well known to those skilled in the art, and includes but is not limited to plasmids; phagemids; cosmids; artificial chromosomes, such as yeast artificial chromosomes (YACs), bacterial artificial chromosomes (BACs) or P1-derived artificial chromosomes (PACs); bacteriophages such as λ phage or M13 phage and animal viruses, etc. The vector may contain a variety of elements for controlling expression, including but not limited to promoter sequences, transcription initiation sequences, enhancer sequences, selection elements, and reporter genes. In addition, the vector may also contain an origin of replication site. The vector may comprise the nucleic acid of the disclosure for easy introduction into the cell for expression. The vector may comprise the expression control element, such as the promoter, terminator and/or enhancer, operably linked to the said nucleic acid.

As used herein, the term "host cell" is a cell into which the nucleic acid molecules have been introduced by molecular biology techniques. These techniques include transfection with a viral vector, transformation with a plasmid vector, and accelerated introduction of naked DNA by electroporation, lipofection, and particle gun. The host cell can be a eukaryotic cell or a prokaryotic cell. The eukaryotic cell is, for example, a yeast cell, an animal cell and/or an insect cell. The prokaryotic cell can be an *E. coli* cell.

The present disclosure also provides a method of producing the collagen or polypeptide, comprising: (1) culturing the host cell herein under suitable culture conditions; (2) harvesting the host cell and/or culture medium comprising the collagen or polypeptide; and (3) purify the collagen or polypeptide. The method of the present disclosure may include the step of enzymatically cleaving the tag.

The collagen or polypeptide of the present disclosure can be prepared into a composition or kit. The composition or kit may be a composition or kit for tissue filling and/or expansion. The composition or kit may also comprise auxiliary substances. The composition of the present disclosure may be a cartilage repair agent comprising the collagen or polypeptide described herein. The composition of the disclosure may be injectable. The composition of the present disclosure can be a structural material of the human body, for example, can be used for cartilage repair, and does not cause an immune response in the human body.

As used herein, the degree of relatedness between two amino acid sequences or between two nucleotide sequences is described by the parameter "sequence identity." For the purposes of this disclosure, the sequence identity between two amino acids is determined by Needleman-Wunsch Algorithm implemented by the Needle program (Needleman and Wunsch, 1970, *J. Mol. Biol.* 48:443-453) of the EMBOSS software package (EMBOSS: The European Molecular Biology Open Software Suite, Rice et al, 2000, *Trends Genet.* 16:276-277) (Version 5.0.0 or later preferred). The parameters used are the gap opening penalty of 10, the gap extension penalty of 0.5, and the EBLOSUM62 (EMBOSS version of BLOSUM62) substitution matrix. Needle's output labeled "Longest Identity" (obtained using the non-simplified option) was used as the percent identity and calculated as follows:

(identical residues×100)/(alignment length−total number of gaps in the alignment)

For the purposes of this disclosure, the sequence identity between two deoxynucleotide sequences is determined by the Needleman-Wunsch Algorithm implemented by the Needle program (Needleman and Wunsch, 1970, *J. Mol. Biol.* 48:443-453) of the EMBOSS software package (EMBOSS: The European Molecular Biology Open Software Suite, Rice et al, 2000, *Trends Genet.* 16:276-277) (Version 5.0.0 or later preferred). The parameters used are the gap opening penalty of 10, the gap extension penalty of 0.5, and the EDNAFULL (EMBOSS version of NCBI NUC4.4) substitution matrix. Needle's output labeled "Longest Identity" (obtained using the non-simplified option) was used as the percent identity and calculated as follows:

(identical deoxyribonucleotides×100)/(alignment length−total number of gaps in the alignment)

Herein, the repeating unit of the collagen or polypeptide of the present disclosure or the collagen or polypeptide may contain certain mutations. For example, one or more of the amino acid sequences of these parts may contain a substitution, deletion, addition or insertion of amino acid residues. In the context of amino acid mutations, the "plurality" can be 2-40, e.g., 2, 3, 4, 5, 6, 7, 8, 9, 10, 11, 12, 13, 14, 15, 16, 17, 18, 19, 20, 21, 22, 23, 24, 25, 26, 27, 28, 29, 31, 32, 33, 34, 35, 36, 37, 38 or 39, or any range of values between them.

That is, the present disclosure can use repeat unit variants as long as the variant retains the activity of promoting cell adhesion. In particular, the variants may have a certain percentage identity with a specified sequence (any of the collagen or polypeptide sequences described herein), such as 80%, 85%, 90%, 91%, 92%, 93%, 94%, 95%, 96%, 97%, 98%, 99% identity. The designated sequence may be any sequence of the disclosure, such as SEQ ID Nos: 1-16, but it is preferred that these variants retain the intended function, such as increasing cell adhesion or cartilage repair.

Methods of the Present Disclosure

In view of the current research status, the present disclosure provides a method for biosynthesizing recombinant type II humanized collagen, that is, a method for preparing human body structural materials. The method may include one or more of the following steps: (1) screening of functional regions and construction of bacterial strains; (2) large-scale biological fermentation culture and induced expression of proteins; (3) purification of the humanized type II collagen and optional enzymatic cleavage.

Screening of functional regions and construction of bacterial strains can be carried out as follows: (1) performing large-scale functional region screening to obtain the functional region of the target gene; (2) inserting the obtained functional region of the target gene into the PET-28a-Trx-His expression vector to obtain a recombinant expression plasmid; (3) transferring the recombinant expression plasmid into the *E. coli* competent cell BL21 (DE3) to screen and obtain positive *E. coli* genetically engineered bacteria.

Large-scale biological fermentation can be carried out as follows: the positive *E. coli* genetically engineered bacteria obtained by screening are added to a shake flask containing an antibiotic stock solution and cultured in a constant temperature shaker at 220 rpm and 37° C.

The induced expression of the protein can be carried out as follows: (1) cooling the shake flask after culture to 16-30° C.; (2) adding IPTG mother solution to induce expression; (3) placing the bacterial solution after induction of expression in a centrifuge bottle, centrifuging at 6000 rpm and 4° C. for 12 min before collecting the bacteria.

The purification of the humanized type II collagen and optional enzymatic cleavage can be carried out as follows: (1) crudely purifying the humanized type II collagen on a Ni affinity chromatography column; (2) adding TEV enzyme for enzymatic cleavage at a certain ratio; (3) finely purifying the humanized type II collagen on an ion exchange column.

The screened functional regions are as follows:

(1) The amino acid sequence of HC2B-a3:

(SEQ ID NO: 1)

gkpgddgeagkpgkagergppgpqgargfpgtpglpgvkghrgypgldgakgeag apgvkgesgspgengspgpmgprglpgergrtgpagaagargndgqp;

(2) The amino acid sequence of HC2B-a6:

(SEQ ID NO: 2)

gkpgkagergppgpqgargfpgtpglpgvkghrgkpgkagergppgpqgargfpg tpglpgvkghrgkpgkagergppgpqgargfpgtpglpgvkghrgkpgkagergp pgpqgargfpgtpglpgvkghrgkpgkagergppgpqgargfpgtpglpgvkghr gkpgkagergppgpqgargfpgtpglpgvkghrgkpgkagerg;

-continued (3) The amino acid sequence of HC2B-b1:

(SEQ ID NO: 3)
gepgregspgadgppgrdgaagvkgdrgetgavgapgapgppgspgpagptgkqg drgeagaqgpmgpsgpagargiqgpqgprgdkgeagepgerglkghrgftglqgl pgppgpsgdqgasgpagpsgprgppgpvgpsgkdgangipgpigppgprgrsget gpa;

(4) The amino acid sequence of HC2B-b3:

(SEQ ID NO: 4)
gspgpagptgkqgdrgeagaqgpmgpsgpagargiqgpqgprgdkgeagepgerg lkghrgftglqglpgppgpsgdqgasgpagpsgpr;

(5) The amino acid sequence of HC2B-b5:

(SEQ ID NO: 5)
gargiqgpqgprgdkgeagepgerglkghrgftglqglpgppgpsgargiqgpqg prgdkgeagepgerglkghrgftglqglpgppgpsgargiqgpqgprgdkgeage pgerglkghrgftglqglpgppgpsgargiqgpqgprgdkgeagepgerglkghr gftglqglpgppgpsgargiqgpqgprgdkgeagepgerglkghrgftglqglpg ppgpsgargiqgpqgprgdkgeagepgerglkghrgftglqglpgppgpsgargi qgpqgprgdkgeagepgerglkghrgftglqglpgppgpsgargiqgpqgprgdk geagepgerglkghrgftglqglpgppgps;

(6) The amino acid sequence of B3Q:

(SEQ ID NO: 6)
gspgpagptgkqgdrgeagaqgpmgpsgpagargiqgpqgprgdkgeagepgerg lkghrgftglqglpgppgpsgdqgasgpagpsgprgspgpagptgkqgdrgeaga qgpmgpsgpagargiqgpqgprgdkgeagepgerglkghrgftglqglpgppgps gdqgasgpagpsgprgspgpagptgkqgdrgeagaqgpmgpsgpagargiqgpqg prgdkgeagepgerglkghrgftglqglpgppgpsgdqgasgpagpsgprgspgp agptgkqgdrgeagaqgpmgpsgpagargiqgpqgprgdkgeagepgerglkghr gftglqglpgppgpsgdqgasgpagpsgpr;

(7) The amino acid sequence of HC2B-A7:

(SEQ ID NO: 7)
gpqgargfpgtpglpgvkghrgypgldgakgpqgargfpgtpglpgvkghrgypg ldgakgpqgargfpgtpglpgvkghrgypgldgakgpqgargfpgtpglpgvkgh rgypgldgakgpqgargfpgtpglpgvkghrgypgldgakgpqgargfpgtpglp gvkghrgypgldgakgpqgargfpgtpglpgvkghrgypgldgakgpqgargfpg tpglpgvkghrgypgldgakgpqgargfpgtpglpgvkghrgypgldgakgpqga rgfpgtpglpgvkghrgypgldgak;

(8) The amino acid sequence of HC2B-A8:

(SEQ ID NO: 8)
gargfpgtpglpgvkghrgypgldgakgargfpgtpglpgvkghrgypgldgakg argfpgtpglpgvkghrgypgldgakgargfpgtpglpgvkghrgypgldgakga rgfpgtpglpgvkghrgypgldgakgargfpgtpglpgvkghrgypgldgakgar gfpgtpglpgvkghrgypgldgakgargfpgtpglpgvkghrgypgldgakgarg fpgtpglpgvkghrgypgldgakgargfpgtpglpgvkghrgypgldgakgargf pgtpglpgvkghrgypgldgakgargfpgtpglpgvkghrgypgldgak;

(9) The amino acid sequence of HC2B-A9:

(SEQ ID NO: 9)
gfgfpgtpglpgvkghrgypgldgakgfpgtpglpgvkghrgypgldgakgfpgt pglpgvkghrgypgldgakgfpgtpglpgvkghrgypgldgakgfpgtpglpgvk ghrgypgldgakgfpgtpglpgvkghrgypgldgakgfpgtpglpgvkghrgypg ldgakgfpgtpglpgvkghrgypgldgakgfpgtpglpgvkghrgypgldgakgf pgtpglpgvkghrgypgldgakgfpgtpglpgvkghrgypgldgakgfpgtpglp gvkghrgypgldgakgfpgtpglpgvkghrgypgldgakgfpgtpglpgvkghrg ypgldgak;

(10) The amino acid sequence of HC2B-A10:

(SEQ ID NO: 10)
gtpglpgvkghrgypgldgakgtpglpgvkghrgypgldgakgtpglpgvkghrg ypgldgakgtpglpgvkghrgypgldgakgtpglpgvkghrgypgldgakgtpgl pgvkghrgypgldgakgtpglpgvkghrgypgldgakgtpglpgvkghrgypgld gakgtpglpgvkghrgypgldgakgtpglpgvkghrgypgldgakgtpglpgvkg hrgypgldgakgtpglpgvkghrgypgldgakgtpglpgvkghrgypgldgakgt pglpgvkghrgypgldgakgtpglpgvkghrgypgldgakgtpglpgvkghrgyp gldgak;

(11) The amino acid sequence of HC2B-B7:

(SEQ ID NO: 11)
gerglkghrgftglqglpgppgpsgdqgasgpagpsgprgerglkghrgftglqg lpgppgpsgdqgasgpagpsgprgerglkghrgftglqglpgppgpsgdqgasgp agpsgprgerglkghrgftglqglpgppgpsgdqgasgpagpsgprgerglkghr gftglqglpgppgpsgdqgasgpagpsgprgerglkghrgftglqglpgppgpsg dqgasgpagpsgprgerglkghrgftglqglpgppgpsgdqgasgpagpsgprge rglkghrgftglqglpgppgpsgdqgasgpagpsgpr;

(12) The amino acid sequence of HC2B-B8

(SEQ ID NO: 12)
gerglkghrgftglqglpgppgpsgdqgasgpagerglkghrgftglqglpgppg psgdqgasgpagerglkghrgftglqglpgppgpsgdqgasgpagerglkghrgf tglqglpgppgpsgdqgasgpagerglkghrgftglqglpgppgpsgdqgasgpa gerglkghrgftglqglpgppgpsgdqgasgpagerglkghrgftglqglpgppg psgdqgasgpagerglkghrgftglqglpgppgpsgdqgasgpagerglkghrgf tglqglpgppgpsgdqgasgpagerglkghrgftglqglpgppgpsgdqgasgpa;

(13) The amino acid sequence of HC2B-B9:

(SEQ ID NO: 13)
gerglkghrgftglqglpgppgpsgdqgerglkghrgftglqglpgppgpsgdqg erglkghrgftglqglpgppgpsgdqgerglkghrgftglqglpgppgpsgdqge rglkghrgftglqglpgppgpsgdqgerglkghrgftglqglpgppgpsgdqger glkghrgftglqglpgppgpsgdqgerglkghrgftglqglpgppgpsgdqgerg lkghrgftglqglpgppgpsgdqgerglkghrgftglqglpgppgpsgdqgergl kghrgftglqglpgppgpsgdqgerglkghrgftglqglpgppgpsgdq;

(14) The amino acid sequence of HC2B-B10:

(SEQ ID NO: 14)
gerglkghrgftglqglpgppgerglkghrgftglqglpgppgerglkghrgftg lqglpgppgerglkghrgftglqglpgppgerglkghrgftglqglpgppgergl

```
-continued
kghrgftglqglpgppgerglkghrgftglqglpgppgerglkghrgftglqglp gppgerglkghrgftglqglpgppgerglkghrgftglqglpgppgerglkghrg ftglqglpgppgerglkghrgftglqglpgppgerglkghrgftglqglpgppge rglkghrgftglqglpgppgerglkghrgftglqglpgppgerglkghrgftglq glpgpp.
```

The amino acid sequence of the recombinant type II humanized collagen prepared by the present disclosure can be derived from the functional region of human natural type II collagen, including this functional region and similar functional regions, the proteins with mutated and modified amino acid sequences.

The recombinant type II humanized collagen prepared by the disclosure completely matches the amino acid sequence of human collagen, so it can be directly injected into the human body for cartilage repair without producing the immunogenic response.

The Collagen or Polypeptide of the Disclosure

The present disclosure provides the collagen or polypeptide, which comprises the amino acid sequence of any one of SEQ ID NO: 1-14 or the amino acid sequence of which the amino acid has been mutated. Mutations can be substitution, addition, deletion, or insertion. Preferably, the substitution may be a retained substitution. The collagen or polypeptide of the disclosure can be derived from the peptide fragments derived from the type II human collagen. The collagen or polypeptide of the disclosure may comprise a plurality of peptide fragments obtained in this way. The peptide segments can be connected through a linker or directly to form the collagen or polypeptide of the present disclosure. The linker can be one or more amino acid residues. For example, the linker may be a flexible linker commonly used in the art.

The present disclosure provides multiple repeating units, as shown in the underlined amino acid sequences of the examples. In particular, the present disclosure provides the repeating unit of the amino acid sequence of SEQ ID NO: 15. The collagen or polypeptide of the present disclosure may contain multiple repeating units, such as 2-30, 2, 3, 4, 5, 6, 7, 8, 9, 10, 11, 12, 13, 14, 15, 16, 17, 18, 19, 20, 21, 22, 23, 24, 25, 26, 27, 28 or 29.

EXAMPLES

The following examples are provided to illustrate the invention. Those skilled in the art should understand that the examples are only illustrative but not restrictive. The invention is limited only by the scope of the appended claims.

Example 1: Construction and Expression of the Recombinant Type II Humanized Collagen 1. Performing large-scale functional region screening. The first was the sequence screening. The Gly-X-Y repetitive gene sequence in the helical region of the natural type II collagen contains a large number of charged amino acids. These charges bind to the cell through interactions, so the regions that do not contain these important charge motifs are excluded. The second was to use computer-assisted protein structure prediction methods to help screen out the potential helical functional regions that have the most interchain hydrogen bond structures and can best stabilize trimer aggregation. The third was to use the prediction method based on the protein expression properties to screen out the functional regions of the human type II collagen with the highest protein expression, easy purification, and good stability. The fourth was to optimize the amino acid fragments of these regions by directly connecting them through n repetitions (the repetitions are to ensure that the molecular weight of the recombinant type II humanized collagen is within a certain range for easy purification and stability); the following target gene functional regions of different recombinant type II humanized collagens were obtained:

```
(1)
the amino acid sequence of HC2B-a3:
                                                                    (SEQ ID NO: 1)
gkpgddgeagkpgkagergppgpqgargfpgtpglpgvkghrgypgldgakgeag apgvkgesgspgengspgpmgprglpgergrtgpagaagargndgqp;

(2)
the amino acid sequence of HC2B-a6:
            (SEQ ID NO: 2, the underlined is the repeating unit portion)
gkpgkagergppgpqgargfpgtpglpgvkghrgkpgkagergppgpqgargfpg tpglpgvkghrgkpgkagergppgpqgargfpgtpglpgvkghrgkpgkagergp pgpqgargfpgtpglpgvkghrgkpgkagergppgpqgargfpgtpglpgvkghr gkpgkagergppgpqgargfpgtpglpgvkghrgkpgkagerg;

(3)
the amino acid sequence of HC2B-b1:
                                                                    (SEQ ID NO: 3)
gepgregspgadgppgrdgaagvkgdrgetgavgapgapgppgspgpagptgkqg drgeagaqgpmgpsgpagargiqgpqgprgdkgeagepgerglkghrgftglqgl
``` pgppgpsgdqgasgpagpsgprgppgpvgpsgkdgangipgpigppgprgrsget gpa;

(4)
the amino acid sequence of HC2B-b3:

(SEQ ID NO: 4)
gspgpagptgkqgdrgeagaqgpmgpsgpagargiqgpqgprgdkgeagepgerg lkghrgftglqglpgppgpsgdqgasgpagpsgpr;

(5)
the amino acid sequence of HC2B-b5:
(SEQ ID NO: 5, the underlined is the repeating unit portion)
gargiqgpqgprgdkgeagepgerglkghrgftglqglpgppgpsgargiqgpqg prgdkgeagepgerglkghrgftglqglpgppgpsgargiqgpqgprgdkgeage pgerglkghrgftglqglpgppgpsgargiqgpqgprgdkgeagepgerglkghr gftglqglpgppgpsgargiqgpqgprgdkgeagepgerglkghrgftglqglpg ppgpsgargiqgpqgprgdkgeagepgerglkghrgftglqglpgppgpsgargi qgpqgprgdkgeagepgerglkghrgftglqglpgppgpsgargiqgpqgprgdk geagepgerglkghrgftglqglpgppgps;

(6)
the amino acid sequence of B3Q:
(SEQ ID NO: 6, the underlined is the repeating unit portion)
gspgpagptgkqgdrgeagaqgpmgpsgpagargiqgpqgprgdkgeagepgerG lkghrgftglqglpgppgpsgdqgasgpagpsgprgspgpagptgkqgdrgeaga qgpmgpsgpagargiqgpqgprgdkgeagepgerglkghrgftglqglpgppgps gdqgasgpagpsgprgspgpagptgkqgdrgeagaqgpmgpsgpagargiqgpqg prgdkgeagepgerglkghrgftglqglpgppgpsgdqgasgpagpsgprgspgp agptgkqgdrgeagaqgpmgpsgpagargiqgpqgprgdkgeagepgerglkghr gftglqglpgppgpsgdqgasgpagpsgpr;

(7)
HC2B-A7:
(SEQ ID NO: 7, the underlined is the repeating unit portion)
gpqgargfpgtpglpgvkghrgypgldgakgpqgargfpgtpglpgvkghrgypg ldgakgpqgargfpgtpglpgvkghrgypgldgakgpqgargfpgtpglpgvkgh rgypgldgakgpqgargfpgtpglpgvkghrgypgldgakgpqgargfpgtpglp gvkghrgypgldgakgpqgargfpgtpglpgvkghrgypgldgakgpqgargfpg tpglpgvkghrgypgldgakgpqgargfpgtpglpgvkghrgypgldgakgpqga rgfpgtpglpgvkghrgypgldgak;

(8)
HC2B-A8:
(SEQ ID NO: 8, the underlined is the repeating unit portion)
gargfpgtpglpgvkghrgypgldgakgargfpgtpglpgvkghrgypgldgakg argfpgtpglpgvkghrgypgldgakgargfpgtpglpgvkghrgypgldgakga rgfpgtpglpgvkghrgypgldgakgargfpgtpglpgvkghrgypgldgakgar gfpgtpglpgvkghrgypgldgakgargfpgtpglpgvkghrgypgldgakgarg fpgtpglpgvkghrgypgldgakgargfpgtpglpgvkghrgypgldgakgargf pgtpglpgvkghrgypgldgakgargfpgtpglpgvkghrgypgldgak;

-continued (9)
HC2B-A9:
(SEQ ID NO: 9, the underlined is the repeating unit portion)
gfpgtpglpgvkghrgypgldgakgfpgtpglpgVkghrgypgldgakgfpgtpg lpgvkghrgypgldgakgfpgtpglpgvkghrgypgldgakfpgtpglpgvkgh rgypgldgakgfpgtpglpgvkghrgypgldgakgfpgtpglpgvkghrgypgld gakgfpgtpglpgvkghrgypgldgakgfpgtpglpgvkghrgypgldgakfpg tpglpgvkghrgypgldgakgfpgtpglpgvkghrgypgldgakfpgtpglpgv kghrgypgldgakgfpgtpglpgvkghrgypgldgakfpgtpglpgvkghrgyp gldgak;

(10) the amino acid sequence of HC2B-A10:
(SEQ ID NO: 10)
gtpglpgvkghrgypgldgakgtpglpgvkghrgypgldgak

Gtpglpgvkghrgypgldgakgtpglpgvkghrgypgldgak

Gtpglpgvkghrgypgldgakgtpglpgvkghrgypgldgak

Gtpglpgvkghrgypgldgakgtpglpgvkghrgypgldgak

Gtpglpgvkghrgypgldgakgtpglpgvkghrgypgldgak

Gtpglpgvkghrgypgldgakgtpglpgvkghrgypgldgak

Gtpglpgvkghrgypgldgakgtpglpgvkghrgypgldgak

Gtpglpgvkghrgypgldgakgtpglpgvkghrgypgldgak;

(11) the amino acid sequence of HC2B-B7:
(SEQ ID NO: 11, the underlined is the repeating unit portion)
gerglkghrgftglqglpgppgpsgdqgasgpagpsgprgerglkghrgftglqg lpgppgpsgdqgasgpagpsgprgerglkghrgftglqglpgppgpsgdqgasgp agpsgprgerglkghrgftglqglpgppgpsgdqgasgpagpsgprgerglkghr gftglqglpgppgpsgdqgasgpagpsgprgerglkghrgftglqglpgppgpsg dqgasgpagpsgprgerglkghrgftglqglpgppgpsgdqgasgpagpsgprge rglkghrgftglqglpgppgpsgdqgasgpagpsgpr;

(12)
the amino acid sequence of HC2B-B8:
(SEQ ID NO: 12)
gasgpagerglkghrgftglqglpgppgpsgdqgasgpagerglkghrgftglqg lpgppgpsgdqgasgpagerglkghrgftglqglpgppgpsgdqgasgpagergl kghrgftglqglpgppgpsgdqgasgpagerglkghrgftglqglpgppgpsgdq gasgpagerglkghrgftglqglpgppgpsgdqgasgpagerglkghrgftglqg lpgppgpsgdqgasgpagerglkghrgftglqglpgppgpsgdqgasgpagergl kghrgftglqglpgppgpsgdqgasgpagerglkghrgftglqglpgppgpsgdq;

(13)
the amino acid sequence of HC2B-B9:
(SEQ ID NO: 13)
gerglkghrgftglqglpgppgpsgdqgerglkghrgftglqglpgppgpsgdqg erglkghrgftglqglpgppgpsgdqgerglkghrgftglqglpgppgpsgdqge rglkghrgftglqglpgppgpsgdqgerglkghrgftglqglpgppgpsgdqger glkghrgftglqglpgppgpsgdqgerglkghrgftglqglpgppgpsgdqgerg lkghrgftglqglpgppgpsgdqgerglkghrgftglqglpgppgpsgdqgergl kghrgftglqglpgppgpsgdqgerglkghrgftglqglpgppgpsgdq;

(14)
the amino acid sequence of HC2B-B10:

(SEQ ID NO: 14)

gerglkghrgftglqglpgppgerglkghrgftglqglpgppgerglkghrgftg lqglpgppgerglkghrgftglqglpgppgerglkghrgftglqglpgppgergl kghrgftglqglpgppgerglkghrgftglqglpgppgerglkghrgftglqglp gppgerglkghrgftglqglpgppgerglkghrgftglqglpgppgerglkghrg ftglqglpgppgerglkghrgftglqglpgppgerglkghrgftglqglpgppge rglkghrgftglqglpgppgerglkghrgftglqglpgppgerglkghrgftglq glpgpp.

Figure 9:
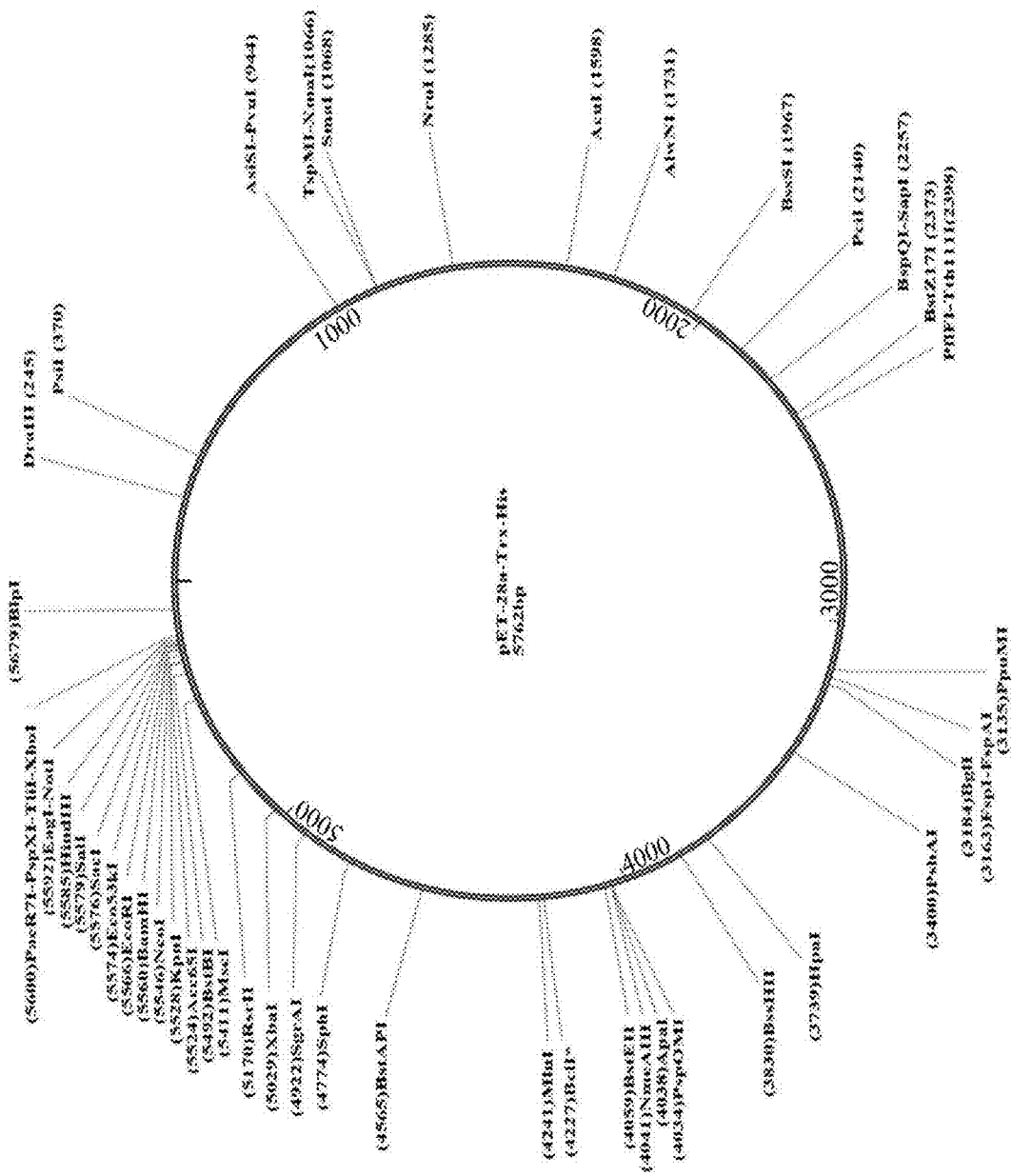
FIG. 9: Map of pET-28a-Trx-His expression vector.

2. The synthesized gene functional region was inserted into the pET-28a-Trx-His expression vector (FIG. 9) to obtain the corresponding recombinant expression plasmid.

3. The successfully constructed expression plasmid was transformed into E. coli competent cell BL21 (DE3). The specific process was as follows: (1) The competent E. coli cells BL21 (DE3) were taken out from the ultra-low temperature refrigerator and placed on the ice. When the cells were half melted, 2 μl of the plasmid to be transformed was taken out and added to the E. coli competent cells BL21 (DE3), and mixed slightly 2-3 times. (2) The mixture was placed on the ice for 30 min, then heated shock in a 42° C. water bath for 45-90 s, and placed on the ice bath for 2 min after removal. (3) The mixture was transferred to a biosafety cabinet, added with 700 μl of liquid LB medium, and then incubated at 37° C. and 220 rpm for 60 min. (4) 200 μl of the bacterial solution was taken and spread evenly on an LB plate containing kanamycin sulfate (50 mg/L). (5) The plate was incubated in a 37° C. incubator for 15-17 h until colonies of uniform size grew.

4. 5-6 single colonies were picked from the transformed LB plate and placed in a shake flask containing antibiotic stock solution (ampicillin, 100 mg/L), and cultured in a constant temperature shaker at 220 rpm and 37° C. for a certain period until appeared foggy. The cultured shake flask was cooled to 16-30° C., added with IPTG (0.5 mM) to induce expression for a period of time before the bacterial solution was dispensed into centrifuge bottles and centrifuged at 6000 rpm and 4° C. for 12 min. The bacterial cells were collected, the weight of the bacterial cells was recorded, and the samples were taken for electrophoresis detection.

5. The collected bacteria were resuspended in a balanced working solution (200 mM sodium chloride, 25 mM Tris, 20 mM imidazole), the bacterial solution was cooled to ≤15° C., homogenized twice or ultrasonically disrupted cells. The bacterial solution was collected after completion. The bacterial solution after cell disruption was dispensed into centrifuge bottles, centrifuged at 17000 rpm and 4° C. for 30 min, and the supernatant was collected.

6. The recombinant type II humanized collagen was purified and enzymatically cleaved. The specific process was as follows: (1) Crude purification: a. Column equilibration: the column was equilibrated with the equilibrium solution (200 mM sodium chloride, 25 mM Tris, 20 mM imidazole) at a flow rate of 10 mL/min. b. Loading: The supernatant after centrifugation was added to the column until the liquid flowed out at a flow rate of 5 mL/min. c. Washing the impure proteins: 100 mL of washing solution (200 mM sodium chloride, 25 mM Tris, 20 mM imidazole) was added until the liquid flowed out at a flow rate of 10 mL/min. d. Collection of the target protein: 20 mL of eluent (200 mM sodium chloride, 25 mM Tris, 250 mM imidazole) was added, with a flow rate of 10 mL/min, the flow-through fluid was collected, the protein concentration was detected by UV-Vis and calculated according to the following formula (C (mg/ml)=A280×dilution factor×extinction coefficient), and the electrophoresis detection was conducted. e. The column was cleaned with IM imidazole working solution at a flow rate of 10 mL/min. (2) Enzymically cleavage: the TEV enzyme was added according to the ratio of total protein amount to the total amount of TEV enzyme at 20:1, and enzymatically cleaved at 16° C. for 2 h. The digested protein solution was put into a dialysis bag, dialyzed at 4° C. for 2 h, and then transferred to new dialysate (20 mM sodium chloride, 20 mM Tris) for overnight dialysis at 4° C. (3) Fine purification: a. Column equilibration: the column was equilibrated with solution A (20 mM Tris, 20 mM sodium chloride) at a flow rate of 10 ml/min. b. Loading: The flow rate was 5 ml/min, the sample was loaded and the flow-through sample was collected, the electrophoresis detection was conducted, and the protein was stored in a 4° C. environment. c. Elution: the column was washed with solution B (1 M sodium chloride, 20 mM Tris) for 5 CV. d. Washing the column.

Figure 2:
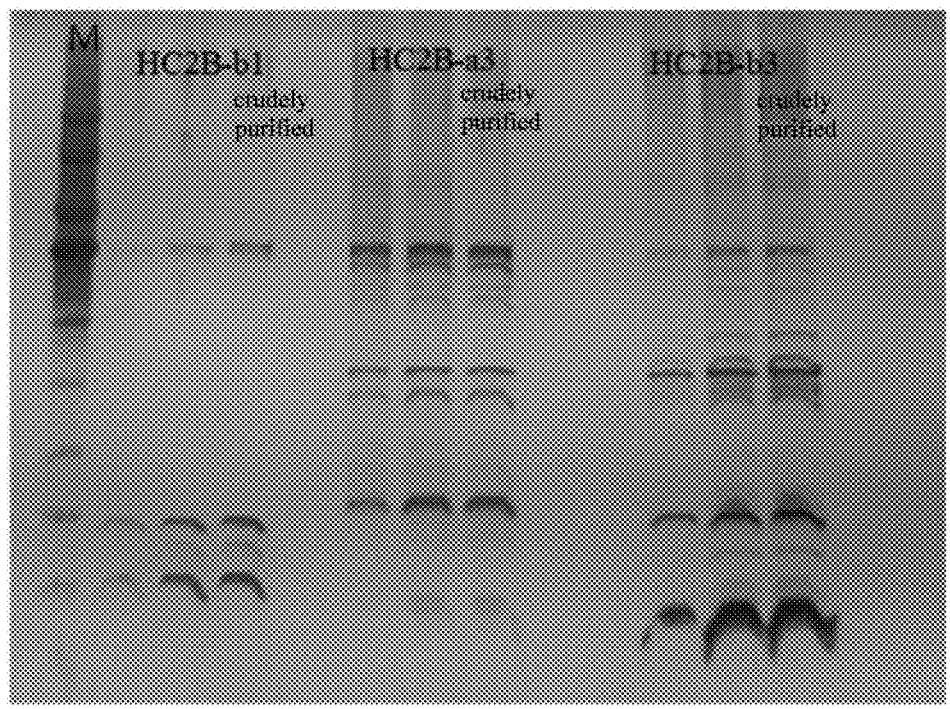
FIG. 2: Crude purification of the recombinant type II humanized collagens HC2B-b1, HC2B-a3, and HC2B-b3.
Figure 3:
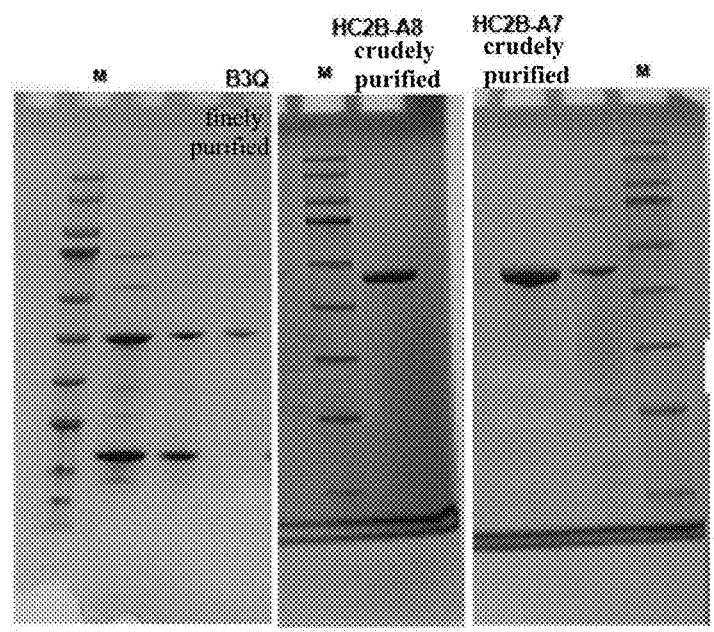
FIG. 3: Purification of the recombinant type II humanized collagens B3Q, HC2B-A8 and HC2B-A7.
Figure 4:
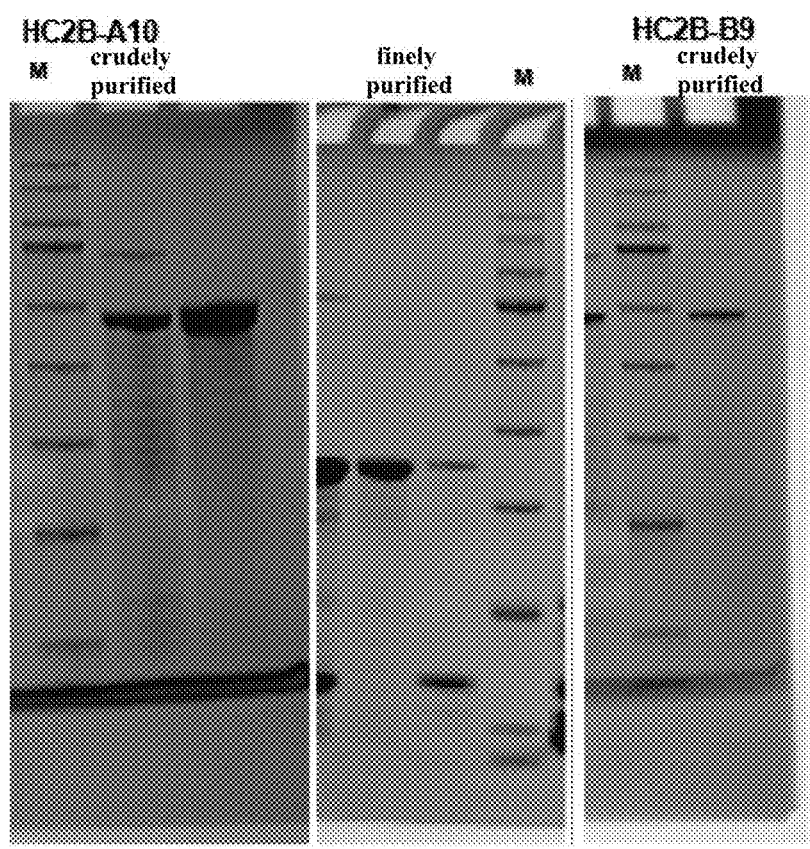
FIG. 4: Purification of the recombinant type II humanized collagen HC2B-A10 and crude purification of the HC2B-B9.
Figure 5:
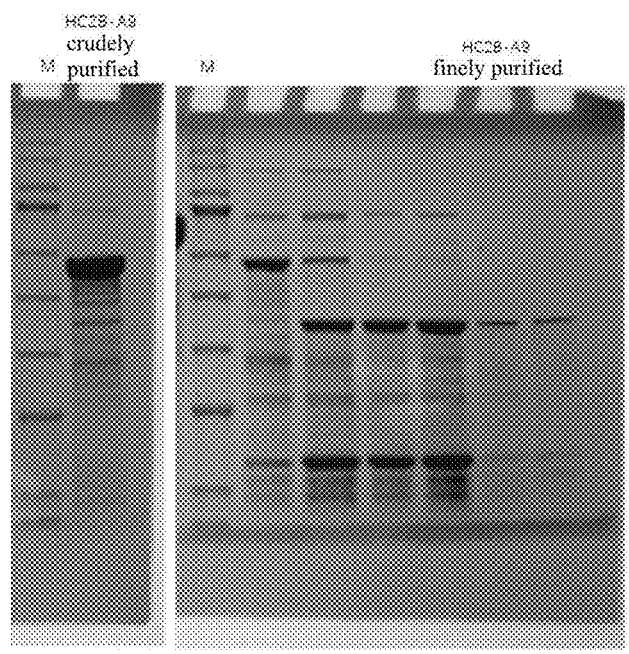
FIG. 5: Purification of the recombinant type II humanized collagen HC2B-A9.
Figure 6:
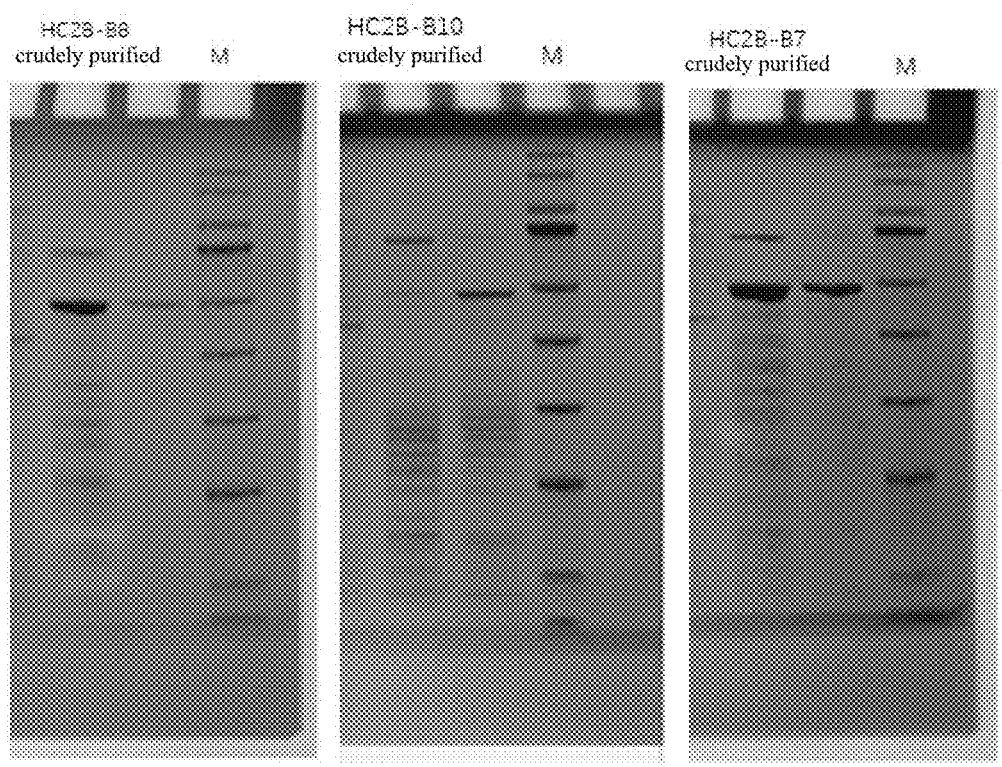
FIG. 6: Crude purification of the recombinant type II humanized collagens HC2B-B8, HC2B-B7, and HC2B-B10.
Figure 7:
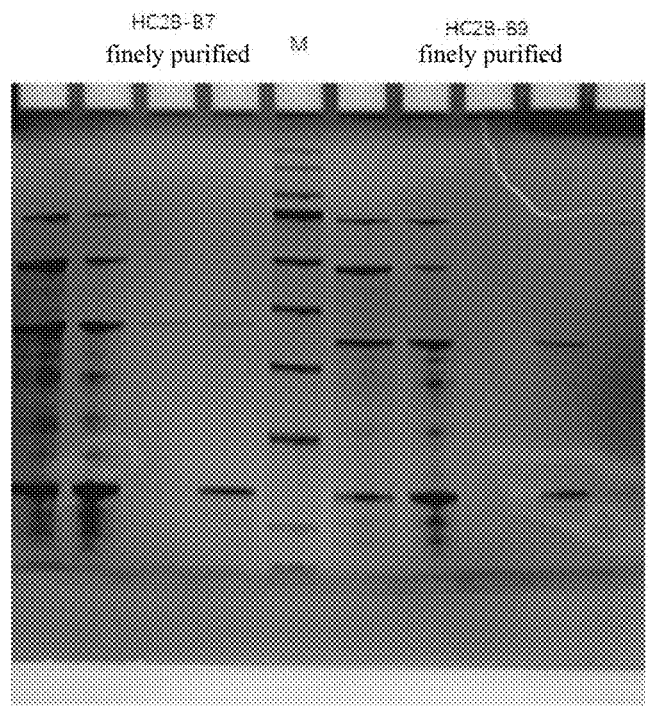
FIG. 7: Fine purification of the recombinant type II humanized collagens HC2B-B7 and HC2B-B9.

Test Results:

The electrophoresis detection results involved in the preparation process of each recombinant protein are shown in FIGS. 1 to 7. FIG. 1 shows the electrophoresis detection results of the recombinant type II humanized collagens HC2B-a6 and HC2B-b5, indicating that the expression amount of the target protein is low after crude purification. FIG. 2 shows the electrophoresis detection results of the recombinant type II humanized collagens HC2B-a3, HC2B-b1, and HC2B-b3, indicating that there is a lot of impure proteins after crude purification and fine purification of the protein. FIG. 3 shows the electrophoresis detection results of the recombinant type II humanized collagens HC2B-HC2B-A7 and HC2B-HC2B-A8, indicating that the expression amount of the target protein is low after crude purification. FIG. 3 also shows the electrophoresis detection results of the recombinant type II humanized collagen B3Q, indicating that the amount of the protein is low after fine purification. FIG. 4 shows the electrophoresis detection results of the recombinant type II humanized collagen HC2B-A10, indicating that the expression level of crudely purified proteins is relatively high, the enzymatic digestion effect is better, and the protein purity is high after fine purification (left and middle panel of FIG. 4). FIGS. 4 and 7 also show the electrophoresis detection results of the recombinant type II humanized collagen HC2B-B9, indicating that the expression level of crudely purified proteins is relatively low with more impurity bands, and the enzymatic digestion effect is poor. FIG. 5 shows the electrophoresis detection results of the recombinant type II humanized collagen HC2B-A9, indicating that the expression level of crudely purified proteins is relatively high with more impurity bands and lower purity. The left panel of FIG. 6 shows the electrophoresis detection results of the recombinant type II humanized collagen HC2B-B8, indicating that the expression level of crudely purified proteins is relatively low with many impurity bands, without subsequent fine purification. The right panel of FIG. 6 and FIG. 7 show the electrophoresis detection results of the recombinant type II humanized collagen HC2B-B7, indicating that the expression level of crudely purified proteins is relatively low with more impurity bands, and the enzymatic digestion effect is poor. The middle panel of FIG. 6 shows the electrophoresis detection of the recombinant type II humanized collagen HC2B-B10. The results indicate that the expression level of crudely purified proteins is relatively low with many impurity bands, without subsequent fine purification.

Therefore, in terms of expression, separation and purification effects, the recombinant type II humanized collagen HC2B-A10 achieved the best effect compared with other recombinant type II humanized collagen.

Example 2: Detection of Biological Activity of Recombinant Type II Humanized Collagen HC2B-A10

The methods of collagen activity detection can refer to Juming Yao, Satoshi Yanagisawa, Tetsuo Asakura, Design, Expression and Characterization of Collagen-Like Proteins Based on the Cell Adhesive and Crosslinking Sequences Derived from Native Collagens, J Biochem. 136, 643-649 (2004). The specific implementation methods were as follows:

(1) the concentration of the protein samples to be tested was detected with ultraviolet absorption, including the bovine type I collagen standard (Sigma, Cat. No.: 380002), the recombinant type II humanized collagen HC2B-A10 with good purification and enzyme digestion effects provided by the present disclosure (No. 015).

Specifically, the ultraviolet absorption of the samples at 215 nm and 225 nm was measured respectively, and the protein concentrations were calculated using the empirical formula C (µg/mL)=144×(A215-A225). Note that the detection needed to be performed when A215<1.5. The principle of this method is that the characteristic absorption of peptide bonds is detected under far-ultraviolet light, which is not affected by the chromophore content, with few interfering substances and is easy to operate, so that is suitable for the detection of human collagen and analogs thereof that do not develop color in Coomassie brilliant blue. (See the reference Walker JM. The Protein Protocols Handbook, second edition. HumanaPress. 43-45). After the protein concentration was detected, the concentration of all proteins to be tested was adjusted to 0.5 mg/mL with PBS.

(2) 100 µL of various protein solutions and blank PBS solution as a control were added to the 96-well plate and let stand at room temperature for 60 min.

(3) $10^5$ 3T3 cells in good culture status were added to each well and incubated at 37° C. for 60 min.

(4) Each well was washed 4 times with PBS.

(5) The absorbance at OD492 nm was detected using an LDH detection kit (Roche, 04744926001). The cell adhesion rate could be calculated based on the value of the blank control. The calculation formula was as follows: cell adhesion $$\text{rate} = \frac{\text{test well} - \text{bank well}}{\text{positive well} - \text{blank well}} \times 100\%.$$

The cell adhesion rate could reflect the activity of the collagen. The higher the activity of the protein, the better it can provide cells with a high-quality external environment in a short time, helping the adhesion of cells.

Figure 8:
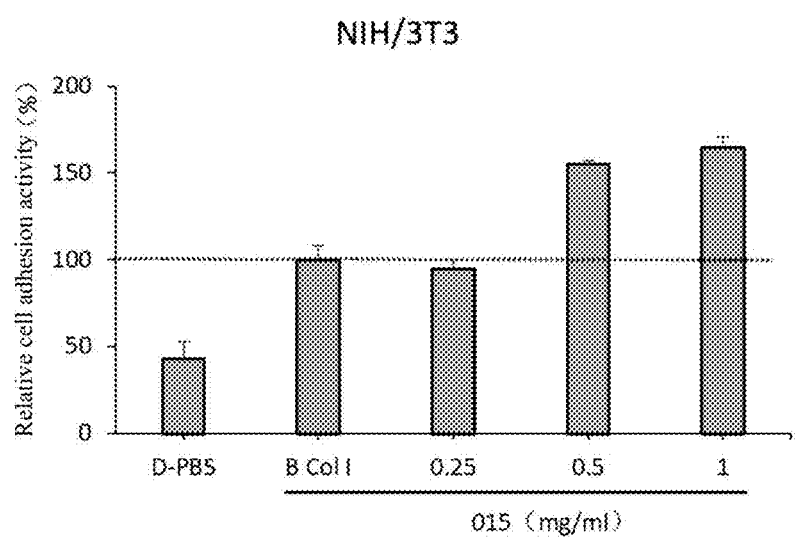
FIG. 8: Activity detection of the recombinant type II humanized collagen HC2B-A10.

The results were shown in FIG. 8. From the comparison, it could be seen that the recombinant type II humanized collagen of the present disclosure had better bioadhesion activity compared with the bovine type I collagen (B col I), that is, the recombinant type II humanized collagen HC2B-A10>the bovine type I collagen. Surprisingly, the present inventors had demonstrated that for HC2B-A10, eight repeating sequences could ensure that the molecular weight of the recombinant type II humanized collagen was easy to purify and stable, and had excellent bioadhesion activity.

Example 3: Mass Spectrometry Detection of the Recombinant Type II Humanized Collagen HC2B-A10

Experimental Method

| Instrument name | Matrix-assisted laser desorption ionization-time of flight mass spectrometer MALDI-TOF/TOF Ultraflextreme ™, Brucker, Germany | | |
|---|---|---|---|
| Matrix | CHCA | Laser energy | 125 |
| Data retrieval software | Mascot | Retrieval species | ALL entries |
| Retrieval database | | NCBIprot | |

The recombinant type II humanized collagen HC2B-A10 with good purification and enzymatic digestion effects provided by the present disclosure was subjected to mass spectrometry detection, and the specific process was as follows:

the protein samples were reduced with DTT and alkylated with iodoacetamide followed by adding the trypsin to enzymatic digestion overnight. The peptide fragments obtained after enzyme digestion were desalted by C18ZipTip, mixed with the matrix α-cyano-4-hydroxycinnamic acid (CHCA) and plated. Finally, the matrix-assisted laser desorption ionization-time of flight mass spectrometer MALDI-TOF/TOF Ulraflextreme™, Brucker, Germany was used for analysis (See Protein J. 2016; 35:212-7 for peptide fingerprinting technology).

Data retrieval was handled by the MS/MS Ion Search page from the local Masco website. The protein identification results were obtained based on the primary mass spectrometry of the peptide fragments produced after enzymatic digestion. Detection parameters: Trypsin enzymatic digestion, with two missed cleavage sites. The alkylation of cysteine was set as a fixed modification. The oxidation of methionine was a variable modification. The database used for identification was NCBprot.

TABLE 1

Molecular weight and corresponding peptides detected by mass spectrometry of HC2B-A10

| Observations | Mr (expected value) | peptide |
| --- | --- | --- |
| 825.4722 | 824.4650 | GTPGLPGVK (SEQ ID NO: 31) |
| 1175.6411 | 1174.6338 | GTPGLPGVKGHR (SEQ ID NO: 32) |
| 877.4276 | 876.4203 | GYPGLDGAK (SEQ ID NO: 33) |
| 2034.0504 | 2033.0432 | GYPGLDGAKGTPGLPGVKGHR (SEQ ID NO: 34) |

The coverage rate of the detected peptide functional region was 100%
GTPGLPGVKGHRGYPGLDGAKGTPGLPGVKGHRGYPGLDGAKGTP
GLPGVKGHRGYPGLDGAKGTPGLPGVKGHRGYPGLDGAKGTPGLP
GVKGHRGYPGLDGAKGTPGLPGVKGHRGYPGLDGAKGTPGLPGVK
GHRGYPGLDGAKGTPGLPGVKGHRGYPGLDGAKGTPGLPGVKGHR
GYPGLDGAKGTPGLPGVKGHRGYPGLDGAKGTPGLPGVKGHRGYP
GLDGAKGTPGLPGVKGHRGYPGLDGAKGTPGLPGVKGHRGYPGLD
GAKGTPGLPGVKGHRGYPGLDGAKGTPGLPGVKGHRGYPGLDGAK
GTPGLPGVKGHRGYPGLDGAK
(SEQ ID NO: 30)

The DNA sequence of HC2B-a3 (SEQ ID NO: 16):
GGTAAACCAGGAGATGATGGAGAAGCAGGAAAACCAGGAAAAGCA

GGAGAAAGAGGACCGCCTGGACCGCAAGGAGCACGTGGATTTCCA

GGAACCCCGGGACTGCCGGGTGTGAAAGGTCATAGAGGATATCCG

GGACTGGATGGAGCAAAAGGAGAAGCAGGGGCACCGGGAGTTAAA

GGTGAGAGCGGAAGCCCGGGAGAAAATGGAAGCCCTGGTCCGATG

GGTCCGAGAGGGCTGCCGGGTGAAAGAGGGCGTACCGGTCCGGCA

GGAGCAGCAGGTGCAAGAGGAAATGATGGACAGCCG

The DNA sequence of HC2B-a6 (SEQ ID NO: 17):
GGAAAACCCGGGAAGGCCGGTGAGCGCGGTCCACCGGGTCCGCAG

GGCGCGCGTGGGTTCCCGGGCACCCCGGGTCTGCCGGGTGTTAAA

GGTCATCGTGGCAAGCCGGGCAAGGCTGGCGAGCGCGGTCCGCCA

GGTCCGCAAGGTGCGAGAGGCTTTCCGGGCACTCCGGGTTTGCCG

GGTGTCAAAGGTCACCGTGGTAAACCGGGCAAGGCGGGTGAGCGT

GGCCCACCGGGTCCGCAGGGTGCGCGTGGTTTTCCGGGCACGCCG

GGTTTGCCGGGCGTTAAAGGCCACCGCGGCAAACCGGGCAAGGCG

GGTGAACGTGGCCCACCGGGTCCGCAAGGTGCACGTGGCTTCCCG

GGCACCCCGGGTCTGCCTGGCGTGAAAGGTCACCGTGGCAAGCCG

GGCAAAGCTGGTGAACGTGGTCCGCCCGGTCCGCAGGGCGCGCGT

GGCTTTCCGGGAACCCCGGGCCTGCCGGGCGTTAAGGGTCATCGT

GGCAAACCGGGCAAGGCTGGTGAGCGCGGGCCACCGGGTCCTCAA

GGTGCCCGTGGCTTCCCGGGCACCCCGGGTCTGCCGGGTGTGAAG

GGTCACCGCGGTAAACCGGGCAAGGCAGGCGAACGCGG

The DNA sequence of HC2B-b1 (SEQ ID NO: 18):
GTGAACCAGGTCGTGAAGGTAGCCCAGGTGCAGATGGACCACCAGG

TCGTGATGGTGCAGCAGGAGTGAAAGGAGATCGTGGTGAAACCGGT

GCAGTAGGTGCACCTGGTGCGCCAGGTCCGCCAGGTAGCCCTGGT

CCAGCCGGTCCTACCGGAAAACAAGGGGATAGAGGAGAAGCAGGA

GCACAGGGTCCGATGGGTCCGTCAGGTCCGGCGGGTGCACGTGGT

ATTCAGGGTCCGCAGGGTCCGCGTGGTGATAAAGGTGAAGCAGGT

GAACCGGGGAAAGAGGATTAAAAGGGCATCGTGGTTTTACGGGT

CTGCAGGGTCTGCCTGGTCCGCCTGGTCCGAGCGGTGATCAGGGT

GCAAGCGGTCCGGCAGGTCCGAGCGGACCTCGTGGACCTCCGGGT

CCTGTGGGTCCTAGTGGTAAGGATGGGCAAATGGTATTCCTGGT

CCTATTGGTCCGCCGGGTCCGCGTGGGAGATCAGGTGAAACCGGA

CCGGCA

The DNA sequence of HC2B-b3 (SEQ ID NO: 19):
GGTAGCCCAGGTCCAGCAGGTCCGACAGGTAAACAAGGAGATCGT

GGTGAAGCAGGAGCACAAGGACCAATGGGTCCAAGCGGTCCGGCA

GGTGCAAGAGGTATTCAAGGGCCGCAAGGGCCACGCGGTGATAAA

GGGGAAGCAGGTGAACCAGGTGAGAGAGGGTTAAAAGGACATCGT

GGATTTACAGGACTGCAGGGTTTACCAGGTCCGCCGGGACCGAGC

GGAGATCAAGGTGCAAGCGGTCCGGCGGGTCCGAGTGGTCCTCGT

The DNA sequence of HC2B-b5 (SEQ ID NO: 20):
GGAGCTAGGGGTATCCAGGGTCCGCAGGGCCCGCGGGAGATAAA

GGGGAAGCGGGTGAACCGGGTGAACGTGGCTTGAAGGGTCATCGT

GGCTTCACCGGCCTGCAGGGCTTGCCGGGTCCGCCGGGTCCGTCC

GGTGCCCGTGGCATCCAGGGACCGCAAGGACCGCGTGGAGACAAA

GGTGAAGCGGGTGAACCGGGTGAGCGCGGCCTCAAGGGCCACCGC

GGCTTCACCGGTTTGCAAGGCCTGCCGGGTCCGCCGGGTCCGTCG

GGCGCGCGTGGTATTCAAGGCCCGCAAGGTCCACGCGGCGACAAA

GGCGAAGCGGGTGAGCCGGGCGAACGCGGCCTGAAAGGTCACCGC

GGTTTTACGGGTCTGCAGGGCCTGCCGGGTCCACCGGGTCCGAGC

GGTGCTCGCGGCATCCAGGGCCCGCAAGGTCCGCGTGGTGATAAG

GGTGAGGCGGGTGAGCCGGGAGAACGTGGTCTGAAGGGTCATAGA

GGCTTCACCGGTCTGCAAGGTCTGCCGGGTCCACCGGGCCCGAGC

GGCGCTAGGGCATTCAGGGCCCGCAGGGGCCGCGTGGTGATAAG

GGCGAGGCCGGTGAGCCGGGCGAACGTGGTTTAAAGGTCATCGC

GGCTTCACGGCCTCCAAGGTCTGCCTGGCCCACCGGGTCCGAGC

GGCGCGCGTGGCATTCAAGGCCCACAGGGTCCTCGTGGCGACAAA

GGCGAGGCAGGCGAGCCGGGTGAGCGCGGTCTGAAAGGGCACCGT

GGTTTTACCGGTTTGCAAGGCCTGCCGGGCCCACCGGGCCCGTCC

GGTGCACGTGGCATTCAGGGTCCGCAGGGTCCGCGTGGCGACAAG

GGCGAAGCTGGTGAGCCGGGTGAGCGCGGCCTTAAGGGTCACCGT

GGCTTTACCGGTTTACAAGGTTTGCCGGGCCCTCCGGGTCCAAGC

GGTGCACGTGGTATCCAAGGCCCACAGGGTCCGCGTGGGGATAAA

GGCGAAGCGGGTGAACCGGGCGAGCGCGGGCTGAAGGGTCACCGT

GGCTTTACTGGCCTGCAGGGTCTGCCGGGTCCACCGGGTCCGTCT

The DNA sequence of B3Q (SEQ ID NO: 21):
GGATCACCCGGGCCGGCGGGCCCGACCGGTAAACAGGGTGACCGC

GGTGAGGCGGGTGCGCAGGGGCCGATGGGTCCGAGCGGTCCGGCT

GGTGCGCGTGGTATCCAGGGACCGCAGGGCCCACGCGGTGATAAA

GGCGAAGCAGGCGAACCGGGTGAGCGCGGTTTGAAGGGCCACCGT

GGTTTTACCGGTCTGCAGGGCCTGCCGGGCCCGCCGGGTCCGTCA

GGCGATCAGGGTGCTAGCGGTCCGGCTGGCCCGTCCGGCCCGCGC

GGTAGCCCGGGCCCAGCTGGCCCGACTGGTAAACAGGGCGACCGT

GGCGAGGCCGGTGCCCAAGGCCCTATGGGCCCGAGCGGTCCGGCA

GGCGCGCGGGGCATCCAGGGTCCGCAAGGACCAAGAGGCGACAAG

GGTGAGGCAGGCGAGCCTGGCGAACGTGGCCTGAAGGGTCACCGC

GGTTTTACCGGTCTCCAAGGTCTGCCTGGTCCACCGGGTCCGTCT

GGAGATCAAGGCGCCAGCGGCCCCGCGGGTCCCTCCGGTCCGCGT

GGCAGCCCGGGTCCGGCAGGACCAACGGGTAAGCAGGGTGATAGA

GGCGAAGCCGGTGCGCAGGGCCCGATGGGTCCTTCGGGTCCAGCG

GGGGCGCGTGGCATTCAAGGTCCGCAGGGCCCGCGTGGTGACAAA

GGTGAGGCGGGCGAACCGGGCGAGCGCGGCTTGAAGGGTCATCGT

GGATTCACCGGTTTGCAAGGCCTGCCGGGCCCCCCGGGCCCGAGC

GGTGACCAAGGAGCTAGCGGGCCGGCTGGTCCGTCGGGCCCGCGT

GGCAGTCCGGGTCCGGCGGGCCCAACGGGCAAGCAAGGAGATCGT

GGTGAGGCGGGTGCGCAAGGTCCGATGGGTCCGTCTGGTCCGGCG

GGTGCACGCGGTATTCAAGGTCCGCAGGGGCGCGTGGTGATAAA

GGAGAAGCAGGCGAACCGGGTGAACGTGGTCTGAAAGGTCATCGT

GGCTTCACCGGCCTGCAGGGTTTACCAGGTCCACCGGGTCCGTCT

GGCGACCAGGGTGCCAGCGGTCCGGCGGGCCCGTCCGGACCGCGT

TAA

The DNA sequence of HC2B-A7 (SEQ ID NO: 22):
GGACCCCAAGGGGCGCGTGGTTTTCCGGGCACCCCGGGCCTGCCG

GGCGTGAAGGGTCACCGCGGTTATCCGGGGCTGGATGGCGCGAAG

GGTCCGCAAGGTGCTCGCGGTTTCCCGGGAACCCCGGGCCTGCCG

GGCGTTAAAGGTCATCGTGGTTATCCGGGTCTGGATGGTGCGAAG

GGCCCACAGGGTGCGCGTGGTTTCCCGGGCACCCCTGGGCTCCCG

GGTGTGAAAGGTCACAGAGGTTACCCGGGCCTGGATGGTGCCAAA

GGTCCGCAAGGTGCGCGTGGTTTTCCGGGCACGCCGGGCTTGCCG

GGTGTTAAAGGTCACCGTGGTTATCCGGGTCTGGACGGCGCAAAG

GGTCCTCAGGGTGCACGCGGCTTCCCGGGTACGCCGGGCCTTCCG

GGCGTGAAGGGCCACCGCGGTTATCCGGGTTTGGACGGTGCCAAG

GGTCCGCAGGGTGCGCGTGGATTCCCGGGAACCCCAGGCCTGCCA

GGTGTGAAGGGCCACCGTGGCTACCCGGGCTTGGACGGTGCTAAA

GGACCGCAGGGCGACACGTGGCTTTCCGGGTACCCCGGGCCTGCCT

GGCGTCAAGGGCCATCGTGGTTACCCGGGCCTGGATGGTGCAAAA

GGCCCACAGGGTGCCCGTGGTTTCCCGGGTACTCCGGGCCTGCCG

GGCGTAAAAGGCCATCGCGGTTACCCGGGTTTGGATGGCGCTAAA

GGCCCACAAGGTGCTAGAGGGTTCCCTGGCACCCCGGGTCTGCCG

GGCGTTAAAGGCCATCGTGGTTACCCGGGCTTGGACGGCGCGAAG

GGTCCGCAAGGCGCGCGTGGTTTTCCGGGTACCCCGGGTCTGCCA

GGCGTTAAGGGTCACCGCGGTTACCCGGGTTTAGACGGTGCGAAA

The DNA sequence of HC2B-A8 (SEQ ID NO: 23):
GGTGCTAGGGGATTCCCGGGAACCCCGGGTCTGCCAGGCGTGAAA

GGTCACCGCGGTTACCCGGGCCTCGACGGCGCGAAGGGTGCCCGT

GGTTTTCCGGGAACCCCGGGCTTGCCAGGTGTCAAGGGCCATCGT

GGTTACCCGGGTCTCGATGGTGCAAAGGGTGCGAGAGGCTTCCCG

GGCACCCCGGGCCTGCCAGGGGTGAAAGGCCACAGAGGCTATCCT

GGCTTGGATGGTGCCAAGGGTGCACGTGGATTCCCGGGCACTCCG

GGTCTGCCGGGCGTGAAGGGCCACCGCGGTTATCCGGGCCTGGAC

GGTGCTAAAGGCGCGCGTGGTTTTCCGGGTACGCCGGGCTTGCCA

GGTGTTAAGGGCCACCGTGGCTACCCGGGGCTGGATGGTGCCAAA

GGTGCTCGCGGTTTCCCGGGAACCCCGGGTCTGCCTGGCGTGAAG

GGTCATCGTGGTTACCCGGGCTTGGACGGCGCTAAGGGTGCGCGT

GGTTTTCCGGGCACCCCGGGTCTGCCGGGGGTGAAAGGTCACCGC

GGTTATCCCGGTCTGGATGGTGCGAAGGGTGCGCGTGGCTTCCCG

GGCACCCCGGGCCTGCCGGGTGTTAAAGGTCATCGTGGTTACCCG

GGCCTGGATGGTGCCAAGGGCGCTCGCGGTTTTCCGGGCACGCCA

GGTTTACCGGGGGTCAAAGGCCATCGTGGCTATCCGGGTTTAGAT

GGCGCGAAAGGCGCACGCGGATTCCCGGGAACCCCGGGCCTGCCT

GGCGTTAAAGGCCACCGCGGTTACCCGGGCCTTGACGGCGCGAAA

GGCGCGCGTGGTTTTCCGGGCACCCCGGGTCTGCCGGGTGTTAAA

GGTCACCGTGGCTATCCGGGTCTGGACGGTGCAAAAGGTGCACGT

GGTTTCCCGGGGACTCCGGGCCTGCCGGGTGTTAAGGGCCATCGT

GGTTACCCGGGTTTGGACGGTGCGAAG

The DNA sequence of HC2B-A9 (SEQ ID NO: 24):
GGATTTCCCGGGACTCCAGGTCTGCCCGGCGTGAAGGGCCACCGC

GGTTATCCGGGCTTGGACGGTGCGAAAGGCTTCCCGGGCACGCCA

GGCTTACCTGGTGTGAAGGGCCATCGTGGTTACCCGGGGCTGGAT

GGTGCGAAGGGTTTTCCGGGCACCCCGGGTCTGCCGGGCGTAAAG

GGCCACCGCGGTTATCCGGGCCTGGACGGTGCAAAAGGTTTTCCG

GGCACCCCGGGCCTGCCGGGTGTGAAGGGCCACCGCGGTTACCCG

```
GGTTTGGACGGTGCCAAGGGATTCCCAGGTACGCCGGGTCTGCCG

GGGGTGAAGGGCCATAGAGGCTACCCGGGCTTGGATGGTGCGAAA

GGTTTCCCGGGAACCCCTGGTCTGCCGGGCGTTAAGGGCCACCGT

GGTTATCCGGGTCTGGATGGCGCGAAAGGTTTTCCGGGAACCCCA

GGTCTGCCGGGCGTTAAAGGTCATCGTGGTTACCCGGGGCTCGAT

GGTGCCAAAGGTTTTCCGGGCACCCCGGGTCTGCCGGGCGTCAAA

GGTCACCGCGGTTATCCGGGTCTGGATGGTGCGAAAGGCTTCCCG

GGAACCCCGGGCCTGCCTGGCGTGAAAGGCCATCGTGGTTATCCG

GGTCTGGATGGTGCTAAAGGATTCCCGGGAACCCCGGGCCTGCCG

GGCGTTAAGGGTCACCGTGGTTACCCGGGCCTGGATGGCGCTAAG

GGTTTCCCGGGTACGCCCGGCCTGCCGGGCGTCAAAGGTCATCGT

GGTTACCCGGGTTTAGACGGCGCAAAAGGTTTTCCCGGGAACCCCG

GGTCTGCCGGGTGTTAAGGGCCATCGTGGCTATCCGGGCTTGGAC

GGTGCAAAGGGTTTTCCTGGTACTCCAGGCTTGCCCGGCGTTAAG

GGCCACCGTGGTTACCCGGGTTTGGACGGCGCTAAAGGCTTTCCG

GGAACCCCGGGTCTTCCGGGCGTGAAAGGTCACCGTGGTTACCCG

GGTCTGGACGGCGCGAAG

The DNA sequence of HC2B-A10 (SEQ ID NO: 25):
GGAACACCCGGGCTGCCGGGTGTTAAGGGCCATCGTGGCTACCCG

GGTTTGGACGGTGCGAAAGGCACCCCTGGCCTGCCGGGTGTCAAA

GGCCATCGTGGTTATCCGGGTCTCGACGGTGCGAAGGGTACCCCA

GGACTGCCGGGTGTTAAAGGTCACCGCGGTTACCCGGGTCTGGAC

GGCGCAAAAGGTACTCCAGGCCTGCCGGGCGTGAAGGGTCATCGT

GGTTACCCGGGCCTGGACGGCGCGAAGGGCACCCCGGGCTTACCG

GGCGTGAAAGGCCATCGTGGTTATCCGGGGTTGGATGGCGCAAAG

GGTACCCCGGGTCTGCCTGGTGTTAAGGGCCACCGCGGTTATCCG

GGCCTGGATGGTGCGAAAGGTACGCCGGGATTGCCGGGTGTGAAG

GGTCATCGTGGTTACCCGGGTCTGGATGGTGCCAAAGGCACGCCA

GGCCTTCCGGGCGTCAAGGGCCACCGCGGTTACCCGGGCCTGGAT

GGTGCGAAAGGTACCCCGGGTTTGCCTGGTGTTAAGGGCCACCGC

GGTTATCCTGGTTTGGACGGCGCGAAAGGAACCCCGGGCCTGCCG

GGTGTTAAAGGCCATCGTGGCTACCCGGGTCTGGACGGCGCTAAA

GGCACTCCGGGTCTGCCGGGCGTGAAGGGCCACCGTGGTTATCCG

GGTTTAGACGGCGCGAAAGGCACCCCAGGCCTGCCGGGTGTCAAG

GGTCACCGCGGTTACCCGGGTCTGGATGGTGCCAAGGGCACCCCG

GGCTTGCCGGGCGTGAAAGGACATCGTGGTTACCCGGGCCTGGAT

GGTGCTAAGGGCACGCCAGGTCTTCCGGGTGTGAAAGGTCACCGT

GGTTATCCGGGTCTGGACGGTGCAAAGGGAACCCCGGGGCTGCCG

GGCGTAAAAGGCCACAGAGGTTATCCGGGTCTTGATGGTGCGAAG

GGCACCCCGGGCCTGCCGGGCGTTAAAGGTCACCGTGGTTACCCG

GGTTTGGACGGCGCTAAA

The DNA sequence of HC2B-B7 (SEQ ID NO: 26):
GGAGAAAGGGGGTTGAAGGGACACCGCGGTTTTACTGGTTTGCAA

GGCCTGCCGGGCCCTCCGGGTCCGTCTGGCGATCAGGGTGCAAGC

GGCCCGGCGGGTCCGTCGGGCCCGCGTGGTGAGCGCGGTCTTAAG

GGCCATCGTGGTTTCACCGGTTTACAAGGTCTGCCGGGCCCGCCG

GGTCCGAGCGGTGATCAAGGGGCCTCCGGTCCGGCTGGCCCGTCC

GGCCCAAGAGGCGAACGTGGTCTGAAAGGTCATCGTGGATTCACC

GGACTGCAGGGTCTGCCTGGTCCGCCTGGTCCGTCAGGCGACCAA

GGTGCGAGCGGTCCGGCGGGTCCGTCCGGTCCGCGTGGTGAACGT

GGTCTGAAAGGCCACCGCGGCTTCACCGGTTTGCAAGGCCTGCCA

GGCCCACCGGGTCCGTCTGGCGACCAGGGAGCCAGCGGTCCGGCT

GGCCCATCTGGCCCACGCGGCGAGCGCGGTCTGAAAGGCCACCGT

GGCTTTACGGGCTTGCAGGGTCTCCCGGGCCCACCGGGCCCGAGC

GGTGATCAGGGTGCCAGCGGACCGGCAGGCCCCTCTGGTCCGCGT

GGTGAACGTGGCCTGAAAGGTCATCGTGGTTTTACCGGTTTACAG

GGCCTGCCAGGTCCCCGGGTCCGTCCGGCGACCAGGGCGCAAGC

GGTCCGGCTGGCCCGAGCGGTCCGCGTGGCGAGCGCGGCCTTAAG

GGCCACAGAGGCTTCACGGGTCTGCAAGGTTTGCCGGGTCCGCCT

GGCCCGTCGGGCGATCAGGGCGCGAGCGGCCCGGCGGGTCCGAGC

GGTCCGCGTGGCGAGCGTGGTCTGAAGGGTCACCGCGGTTTTACC

GGTCTGCAAGGTCTGCCGGGTCCGCCTGGCCCGAGCGGCGACCAG

GGAGCGAGCGGTCCGGCGGGTCCGAGTGGTCCGCGT

The DNA sequence of HC2B-B8 (SEQ ID NO: 27):
GGGGAAAGGGGACTCAAAGGTCACCGCGGTTTCACGGGCCTTCAA

GGTCTGCCGGGTCCTCCGGGTCCGAGCGGCGACCAAGGTGCGTCT

GGCCCAGCGGGTGAGCGTGGTTTAAAAGGCCACCGCGGTTTCACC

GGCCTGCAGGGTTTACCGGGTCCGCCTGGCCCGAGCGGTGATCAA

GGTGCAAGCGGCCCGGCAGGCGAACGCGGTCTGAAAGGCCATAGA

GGTTTTACCGGCCTGCAGGGCTTGCCGGGCCCGCCGGGCCCGAGT

GGCGATCAAGGTGCTTCCGGCCCGGCGGGTGAACGTGGCCTGAAG

GGCCATCGTGGCTTTACCGGTCTGCAGGGCCTGCCAGGTCCGCCG

GGCCCGTCTGGCGACCAGGGTGCGAGCGGTCCAGCCGGTGAGCGC

GGCTTGAAGGGCCACCGCGGCTTTACGGGTTTGCAAGGTCTGCCT

GGTCCGCCGGGCCCGTCAGGCGATCAAGGGCGAGCGGCCCGGCG

GGTGAACGTGGTCTGAAAGGTCATCGTGGATTCACCGGCCTGCAG

GGTCTGCCGGGCCCGCCCGGCCCGTCCGGTGACCAGGGTGCTTCC

GGTCCGGCTGGTGAGCGCGGTCTTAAGGGACACCGTGGCTTCACC

GGTCTGCAGGGCTTGCCGGGTCCTCCGGGGCCGAGCGGCGACCAG

GGTGCGTCCGGCCCGGCGGGTGAACGTGGTCTGAAGGGCCACCGT

GGTTTTACCGGCTTGCAAGGTCTGCCGGGTCCACCGGGTCCGTCT

GGCGATCAGGGAGCCAGCGGTCCGGCAGGCGAGCGTGGTTTGAAG

GGTCACCGTGGATTCACCGGCCTGCAGGGGCTGCCGGGCCCGCCG
```

GGTCCGTCGGGCGATCAGGGAGCGAGCGGTCCGGCAGGTGAGCGT

GGTCTGAAAGGCCATCGTGGCTTCACTGGTTTGCAAGGCCTGCCT

GGCCCACCGGGTCCGAGCGGTGACCAGGGTGCCAGCGGTCCGGCT

The DNA sequence of HC2B-B9 (SEQ ID NO: 28):
GGAGAAAGGGGGCTTAAGGGCCATCGTGGCTTCACGGGTTTGCAG

GGCCTGCCGGGCCCACCGGGTCCGAGCGGCGATCAAGGCGAGCGG

GGCCTGAAAGGTCATCGTGGCTTTACCGGTTTGCAGGGCCTGCCG

GGCCCACCGGGACCGAGCGGTGATCAGGGGAGCGTGGTCTGAAA

GGTCATCGTGGTTTTACCGGTCTGCAGGGTTTGCCGGGTCCTCCG

GGTCCGTCTGGCGACCAAGGTGAGCGTGGTCTGAAAGGTCATCGT

GGTTTCACCGGTTTACAAGGCCTGCCGGGCCCACCGGGTCCGAGC

GGTGACCAAGGCGAGCGTGGCCTGAAAGGCCACCGCGGTTTCACC

GGTCTTCAGGGTCTGCCGGGCCCACCGGGTCCCAGCGGTGACCAG

GGTGAACGCGGTCTGAAGGGTCACAGAGGCTTCACCGGTCTCCAA

GGCTTACCGGGTCCGCCGGGCCCGAGCGGTGATCAGGGCGAACGT

GGTCTGAAGGGCCACCGTGGCTTTACGGGTCTGCAAGGCCTGCCG

GGTCCGCCGGGTCCGTCGGGCGACCAGGGTGAGCGCGGTTTGAAG

GGCCACCGTGGATTCACCGGCCTGCAGGGCCTGCCGGGACCGCCT

GGTCCGTCAGGTGATCAGGGTGAGCGCGGTCTCAAGGGTCATCGT

GGTTTTACCGGTTTACAAGGTTTGCCGGGTCCGCCTGGCCCGTCT

GGTGATCAAGGCGAACGTGGTCTGAAAGGCCACCGCGGCTTCACT

GGTCTGCAGGGCTTGCCGGGCCCACCGGGTCCGTCCGGCGATCAA

GGCGAACGTGGTCTGAAGGGTCACCGCGGATTCACGGGCCTGCAG

GGCCTGCCGGGTCCGCCAGGTCCGTCCGGCGACCAGGGCGAACGC

GGGCTGAAAGGTCACCGTGGCTTTACCGGTTTGCAAGGACTGCCG

GGTCCGCCGGGCCCGAGCGGCGACCAG

The DNA sequence of HC2B-B10 (SEQ ID NO: 29):
GGAGAAAGGGGGCTGAAGGGTCACCGTGGTTTTACCGGTTTGCAA

GGTTTGCCGGGTCCGCCGGGTGAGCGCGGCCTGAAGGGTCATCGT

GGCTTCACCGGCCTGCAAGGCCTGCCGGGTCCGCCGGGTGAGCGT

GGTCTCAAGGGTCATCGTGGCTTTACCGGTTTACAGGGTCTGCCG

GGCCCACCGGGCGAGCGCGGTCTGAAAGGCCATCGTGGATTCACC

GGCCTGCAGGGCTTGCCGGGTCCACCGGGCGAAAGAGGCTTAAAA

GGTCACCGTGGTTTTACGGGTCTGCAAGGTCTGCCGGGTCCGCCG

GGTGAACGTGGCCTTAAGGGTCACCGCGGCTTCACTGGTCTGCAG

GGTTTGCCGGGTCCGCCTGGTGAAAGGGGTCTGAAAGGCCATCGT

GGTTTCACCGGTCTGCAGGGCCTGCCGGGCCCACCGGGTGAGAGA

GGCTTGAAGGGTCACCGTGGTTTTACGGGCCTGCAGGGTCTGCCG

GGCCCGCCGGGTGAGCGCGGTCTTAAGGGCCACCGTGGATTCACC

GGCCTTCAAGGTCTGCCGGGTCCGCCGGGGGAGCGTGGCCTGAAA

GGTCATCGCGGCTTCACCGGTTTGCAAGGTTTGCCAGGCCCACCG

GGCGAACGTGGCCTGAAAGGGCACCGTGGTTTTACTGGTTTGCAG

GGCCTGCCGGGCCCGCCGGGCGAGCGCGGTTTGAAGGGCCACCGT

GGTTTCACGGGCCTGCAAGGTCTGCCGGGCCCTCCGGGAGAACGC

GGTCTGAAAGGTCACCGTGGCTTCACCGGCCTGCAGGGTCTACCG

GGTCCACCGGGCGAGCGCGGACTGAAAGGTCATCGCGGCTTCACC

GGTCTGCAGGGCCTGCCGGGTCCGCCGGGTGAACGTGGCCTGAAA

GGCCACCGCGGTTTTACCGGTTTACAAGGCTTGCCGGGTCCGCCG

GGTGAACGTGGCTTGAAGGGCCATCGTGGCTTTACCGGTCTTCAG

GGGCTGCCGGGCCCGCCT

---

The invention claimed is:

1. A recombinant type II humanized collagen comprising a plurality of repeating units, wherein the repeating unit consists of an amino acid sequence as shown in SEQ ID NO: 15, an amino acid sequence obtained by a substitution, insertion, deletion or addition of 1-4 amino acid residues of the amino acid sequence of SEQ ID NO: 15, or an amino acid sequence having 90% to 99% identity thereto, and each of the repeating units is directly connected, the number of the repeating unit is 2-20.

2. A composition comprising the collagen according to claim 1.

3. The composition according to claim 2, being the composition for cartilage repair.

4. A method for cartilage repair, including using the collagen according to claim 1.

5. The collagen of claim 1, wherein the number of the repeating unit is 6-10.

6. The collagen of claim 1, wherein the collagen comprises an amino acid sequence as shown in SEQ ID NO: 10, an amino acid sequence obtained by a substitution, insertion, deletion or addition of one or more amino acid residues of the amino acid sequence of SEQ ID NO: 10, or a variant having 80% to 99% identity thereto.

7. The composition of claim 3, which is one or more of a biological dressing, a human bionic material, a plastic surgery material, an organoid culture material, a cardiovascular stent material, a coating material, a tissue injection filling material, an ophthalmic material, an obstetrics and gynecology biomaterial, a nerve repair regenerative material, a liver tissue material, and blood vessel repair regeneration material, a 3D printed artificial organ biomaterial, a cosmetic raw material, a pharmaceutical excipient, and a food additive and/or which is an injectable composition or an oral composition.

* * * * *